Sept. 29, 1953   L. W. HELLER   2,653,447
COMBINED CONDENSING VAPOR AND GAS TURBINE POWER PLANT
Filed Oct. 31, 1946   12 Sheets-Sheet 1

INVENTOR
Lewis W. Heller
BY
ATTORNEY

Sept. 29, 1953      L. W. HELLER      2,653,447
COMBINED CONDENSING VAPOR AND GAS TURBINE POWER PLANT
Filed Oct. 31, 1946      12 Sheets-Sheet 2

INVENTOR
Lewis W. Heller
BY
J. P. Moran
ATTORNEY

Sept. 29, 1953 L. W. HELLER 2,653,447
COMBINED CONDENSING VAPOR AND GAS TURBINE POWER PLANT
Filed Oct. 31, 1946 12 Sheets-Sheet 4

Inventor
Lewis W. Heller
By
Attorney

Sept. 29, 1953 L. W. HELLER 2,653,447
COMBINED CONDENSING VAPOR AND GAS TURBINE POWER PLANT
Filed Oct. 31, 1946 12 Sheets-Sheet 5

INVENTOR
Lewis W. Heller
BY
ATTORNEY

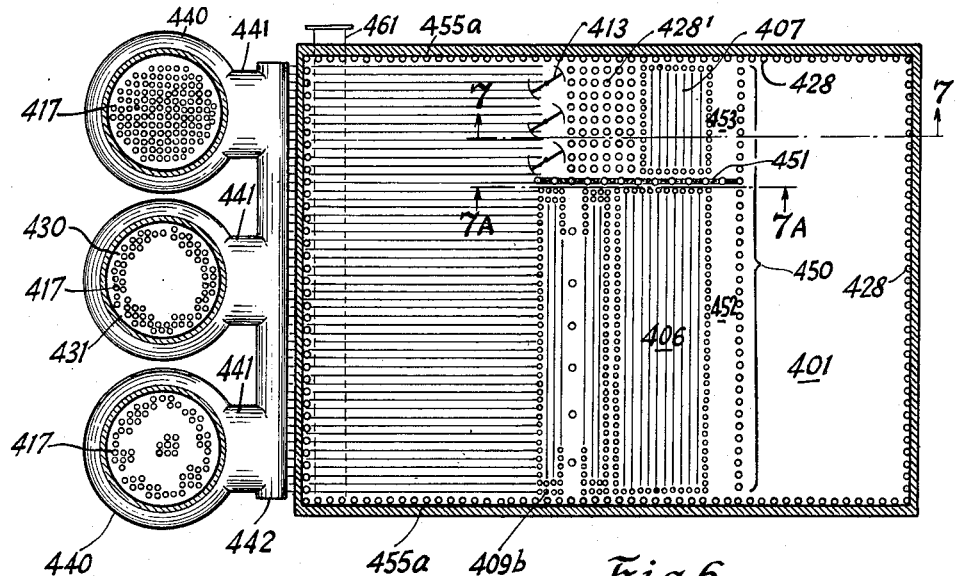
Fig. 6
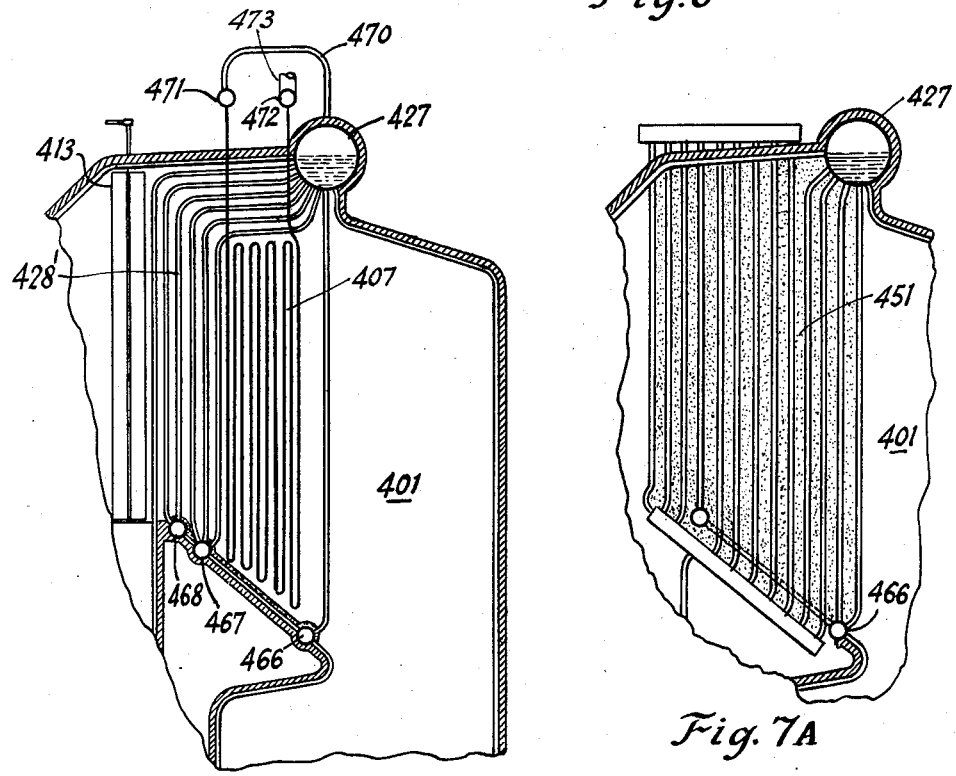
Fig. 7
Fig. 7A

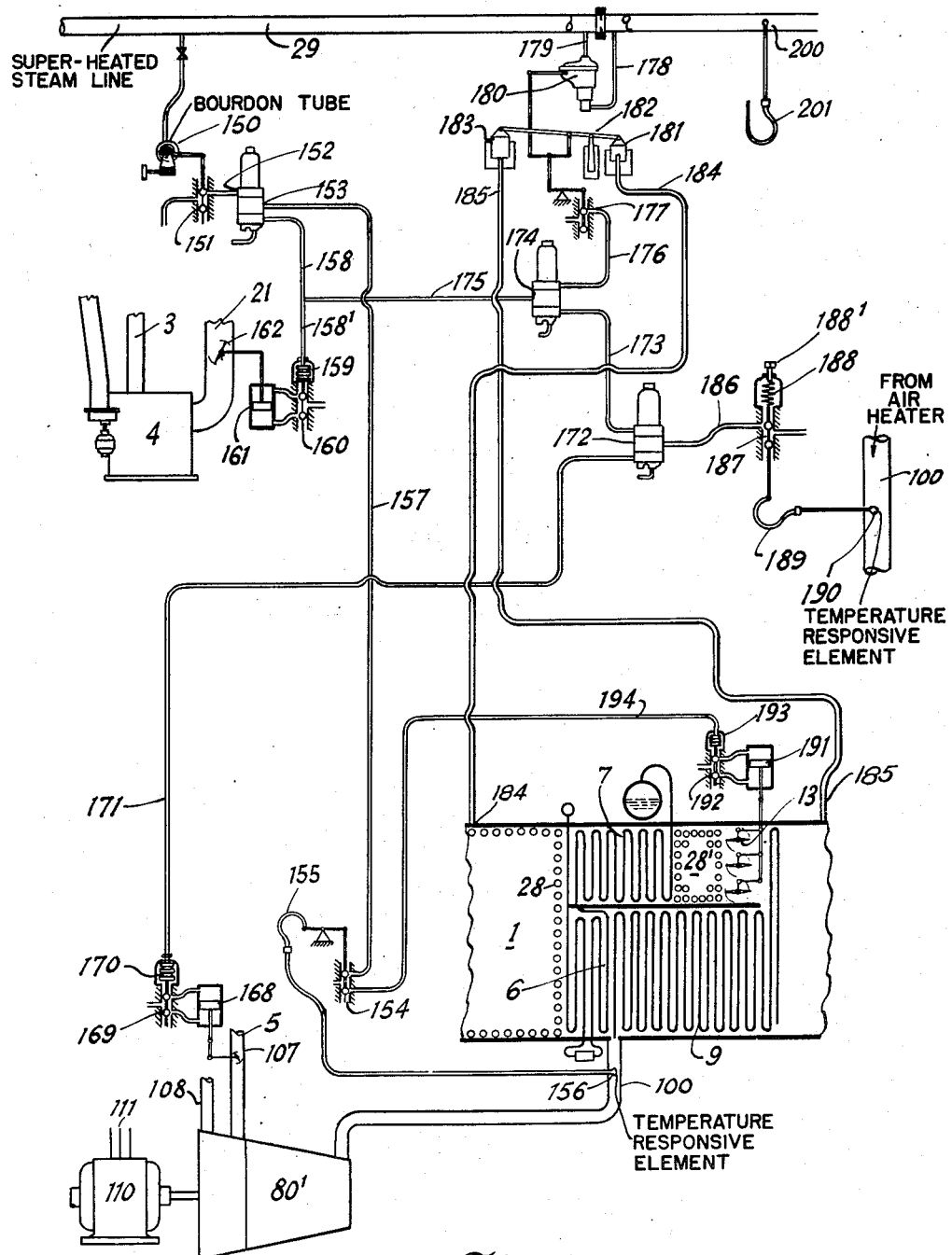

INVENTOR
Lewis W. Heller
BY
ATTORNEY

Patented Sept. 29, 1953

2,653,447

UNITED STATES PATENT OFFICE 2,653,447

COMBINED CONDENSING VAPOR AND GAS TURBINE POWER PLANT

Lewis W. Heller, Yardley, Pa., assignor to The Babcock & Wilcox Company, New York, N. Y., a corporation of New Jersey Application October 31, 1946, Serial No. 706,926

26 Claims. (Cl. 60—49)

The present invention relates to the construction and operation of binary fluid power plants, and more particularly, to improvements in the construction and operation of large capacity power plants of this general type for increasing the overall thermal efficiency of the plant.

The present invention has for its primary object the provision of a binary fluid power plant system which may be economically constructed to operate with high power output capacities and high thermal efficiency.

A further object of the invention is the provision of a binary fluid power plant of the character described which utilizes readily available and correspondingly cheap motive fluids.

Another object of the invention is the provision of a power plant in which a gaseous fluid prime mover may be advantageously utilized in production of power from a heated gaseous fluid deriving its heat from the burning of fuel but without contamination by the products of combustion of the fuel.

Another object is the provision of a binary fluid power plant which combines a vapor prime mover section and a pressure gaseous fluid section having a multi-stage compressor for the gaseous fluid wherein compressor interstage cooling of the gaseous fluid is attained by transfer of heat to the feed liquid of the vapor section vapor generator.

Another object is the provision of a binary fluid power plant which combines a vapor prime mover section and a pressure gaseous fluid section and in which the exhaust from a gaseous fluid prime mover is directed into heat transfer relationship with the heat absorbing surface of a fuel fired vapor generator, whereby a portion of the heat of the exhaust may be more effectively utilized.

Another object is the provision of a binary fluid power plant which combines a vapor generator and a pressure gaseous fluid prime mover which exhausts a heated combustion constituent to the fuel fired furnace of the vapor generator, with apparatus for attaining coordinated regulation of the variable operating factors of the apparatus.

Another object is the provision of a binary fluid prime mover type power plant comprising a high temperature low pressure hot gase prime mover which delivers its exhaust heat into a vapor generating and vapor heating unit which in turn delivers superheated vapor to a vapor prime mover, the recovery of the inter-cooler heat of the gas prime mover compressor into the feed water cycle of the vapor generating and heating unit.

Another object is the provision of a binary fluid power plant consisting of a variable speed air compressor supplying air in accordance with requirements of combustion of a fuel fired furnace which serves a vapor generator and superheater and an air preheater, with the preheated pressure air being expanded through a prime mover to generate power.

Another object is the provision of a binary fluid power plant cycle involving the multiple stage compression of air, in which the heat removed by inter-coolers between stages of the air compressor supplying air under pressure to an aerodynamic turbine and to a furnace, is recovered for utilization in the vapor section heat cycle with control apparatus regulating related elements in a manner to attain a high efficiency over a wide load range.

Another object is to simplify a power plant cycle through the use of a super-atmospheric furnace serving a vapor generating and superheating unit and air heater, by supplying combustion air to the furnace direct from the exhaust of an aerodynamic turbine at a super-atmospheric pressure sufficient to overcome the flow resistance imposed by the heat absorbing elements of the vapor generating and superheating unit and air heater.

Another object is the provision of a binary fluid power plant comprising a combination of a condensing vapor power generating system and a heated gaseous fluid power generating system with effective inter-connection of the two systems through heat exchange between the low temperature fluids being fed to their respective heaters, as well as by a utilization of heat in the gaseous exhaust from the gaseous fluid prime mover in the generation of vapor and the heating of the gaseous fluid.

Another object is the provision of apparatus for and a method of operation of a binary fluid power plant whereby a variation in the excess air introduced to the furnace along with combustion air for the fuel is utilized in affecting furnace and gas temperature for the purpose of varying heat absorption to radiant and convection heat absorbing surfaces served thereby.

Another object is to incorporate a gaseous fluid prime mover into a combination binary fluid power plant in a manner to permit the plant to respond quickly to rapid changes in connected load.

Another object is the provision of combustion control apparatus regulating fuel and combustion air to a furnace which supplies heating gases at varying rates of flow for the generation of large quantities of steam and for the high temperature heating of corresponding large quantities of air with a varying ratio of steam to air quantities.

Another object is the provision of a gas turbine in combination with a vapor generating and utilizing power plant in such a manner to secure a higher thermal operating efficiency for the combination than that of the basic steam plant.

Another object is the provision of a high capacity power plant involving the utilization of a high temperature non-condensing gaseous fluid prime mover and developing its heat supply by the burning of ash-carrying pulverized fuel at high rates and at high furnace temperatures within the ash fusion temperature range.

Another object is the provision of a fuel fired superheated steam generator and air heating unit in which steam superheating and high temperature air heating are accomplished by products of combustion flowing from a common furnace, while low temperature air heating is accomplished by heat transfer from a combination of the products of combustion and super-atmospheric temperature air exhausted from a multiple stage aerodynamic turbine served by the air heating unit.

Another object is the provision of a multiple stage aerodynamic power generating prime mover and conduit connections from two or more stages thereof whereby air at different pressures and temperatures may be advantageously exhausted for use as combustion air in a related air heating furnace or exhausted in part to the heating gas pass rearwardly of the furnace in respect to gas flow.

Another object is the provision of a fuel fired heat absorbing unit arranged to simultaneously generate and superheat large quantities of steam and heat correspondingly large quantities of air under a substantial super-atmospheric pressure, with an air delivery temperature of 1300 F. or above.

The various features of novelty which characterize my invention are pointed out with particularity in the claims annexed to and forming a part of this specification. For a better understanding of the invention, its operating advantages and specific objects attained by its use, reference should be had to the accompanying drawings and descriptive matter in which I have illustrated and described preferred embodiments of my invention.

Of the drawings:

Fig. 6 is a sectional view taken on the line 6—6 of Fig. 5;

Figs. 7 and 7A are sectional views taken on the lines 7—7 and 7A—7A respectively of Fig. 6;

Fig. 8 is a diagrammatic illustration of the arrangement of control apparatus;

*The binary fluid power plant*

In accordance with my invention, a binary fluid power plant is made up in general of apparatus forming an aerodynamic turbine section and a condensing vapor turbine section, interconnected and interregulated, and having a common fuel fired heat absorbing unit incorporating vapor generating and superheating surface and air heating surface and arranged to supply high temperature air and high temperature superheated vapor to the respective turbine sections.

Figure 1:
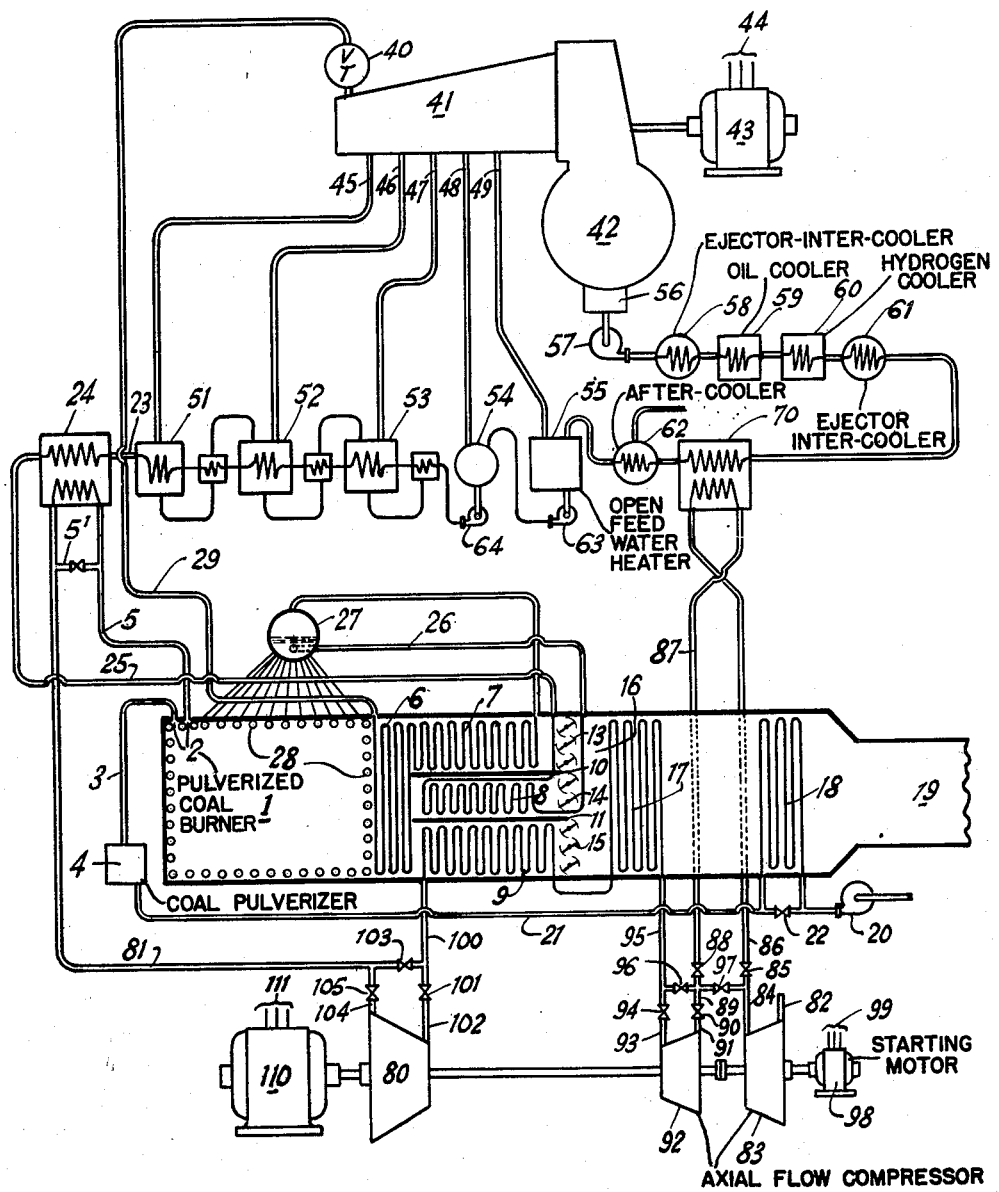
Fig. 1 is a diagrammatic illustration of a combined condensing steam power plant and an air turbine power plant constructed and arranged in accordance with my invention.

In the embodiment illustrated in Fig. 1, the fuel fired heat absorbing unit has a furnace 1 fired with one or more pulverized coal burners 2 directed to bring together an air-borne stream of pulverized coal, conveyed by conduit 3 from a pulverizer 4 and secondary combustion air under superatmospheric pressure from a conduit 5. The furnace walls are lined in a well known manner with heat absorbing tubes 28 permitting furnace operation at high rates and high combustion temperatures. From the furnace the products of combustion pass across a high temperature steam superheater 6 and then pass through three parallel gas passes in which a secondary superheater 7, an economizer 8, and a high temperature air heater 9 are positioned in heat transfer relation to the gases.

The passes are defined by partition walls 10 and 11 and the gas flow through the individual passes is controlled by sets of dampers 13, 14 and 15. Rearward of the outlet of the passes a chamber 16 is provided for equalization of gas flow pressure and temperature conditions. From the chamber 16 the gases under pressure pass over a low temperature air heater tube bank 17 and then over a separate primary air heater tube bank 18 to a stack connection 19 exhausting to the atmosphere. A primary air blower 20 supplies air under pressure to the air heater 18 from which it flows to the pulverizer 4 by conduit 21 at a pressure sufficiently above atmosphere to overcome the pulverizer pressure drop and provide a superatmospheric pressure for the fuel and air discharged through the burners 2. For purposes of regulating the temperature of the air flowing through conduit 21, as required by the fuel and pulverizer characteristics, a valved bypass connection 22 is provided.

A conduit 23 supplies feedwater from a feedwater supply reservoir and condensate heated by turbine stage bleed heaters, as will be later described, to an air feedwater heater 24 from which it flows through feed pipe 25 to the multiple loop economizer 8 and then to a boiler steam and water drum 27 by a feed connection 26. The water space of the steam and water drum 27 is connected in a circulatory arangement to steam generating tubes, some of which, such as the tubes 28, extend along the walls of the furnace chamber and across the gas outlet to the primary superheater section 6. The manner in which tubes 28 are connected to the stream and water drum corresponds to the connections of tubes 428 and 428ª to drum 427 of Fig. 5, as hereinafter described. The steam generated in the tubes is separated from the water in the drum and passed serially through the superheater sections 7 and 6 for superheating to the desired degree. Superheated steam is passed by pipe 29 to the throttle valve 40 of a steam turbine 41 through which it expands with a reduction in pressure to the vacuum of a condenser 42, developing mechanical power which is transmitted to a directly connected electrical generator 43 delivering electrical energy by connections 44 to the station bus bars.

Figure 6A:
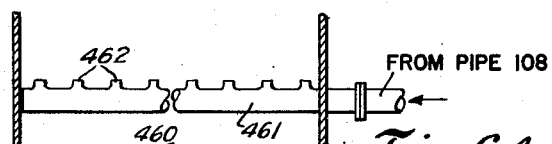
Fig. 6A is a fragmentary section taken on the line 6A—6A of Fig. 5.

The steam turbine arrangement disclosed represents a well-known regenerative feed water heating cycle in which the condensate resulting from the condensation of the turbine exhaust steam in the condenser 42, is progressively heated by steam bled from selected pressure stages of the turbine by connections 45, 46, 47, 48, and 49. The steam prime mover and related feed water heating auxiliaries represented in Fig. 1 correspond to similar apparatus in the regenerative steam plant cycle described by Gibson and Cushing in a paper entitled "Advanced Design in New 160,000 kw. Oswego Steam Station" as published in the Transactions of the American Society of Mechanical Engineers of August 1942, pp. 541–554. The steam pressure, temperature and rate of flow of the steam turbine, as well as the feed water and condensate temperatures involved, are disclosed by the heat-balance diagram of Fig. 6 appearing on page 545 of the publication and the data submitted therein illustrates important characteristics of the steam plant included in the present combination.

As indicated in Fig. 1, the connections 45 to 49 supply heating steam to feedwater heaters 51, 52, 53, 54 and 55, respectively.

Condensate which collects in the hot well 56 of the condenser is withdrawn by a condensate pump 57 and discharged in heat transfer relationship serially through the cooler of an air ejector inter-cooler 58, an oil cooler 59, a generator hydrogen cooler 60, and a second inter-cooler 61, from which it is passed through one or more heat exchangers 70 to a third after-cooler 62 and then to the open stage feed water heater 55.

Condensate is withdrawn from heater 55 by condensate pump 63 and discharged into heater 54 from which the boiler feed pump 64 discharges the condensate through the higher pressure stage heaters 53, 52 and 51 in series, with a progressive heating of the water to the extent that at full rate output of the turbine the temperature of the water leaving heater 51 will not be greatly below the boiler water temperature, so that only a relatively small economizer will be required to heat the water to that temperature.

In the customary regenerative steam plant cycle a feed water heater receiving low pressure steam from a bleed connection at a lower pressure turbine stage than the bleed connection 49 is usually included in the feed water heating flow path, but in the present instance such a heater has been replaced by one or more heat exchangers 70 in which the condensate is heated by a heated gaseous fluid from a source independent of the steam turbine, as is explained hereinafter. Inasmuch as a reduced amount of steam will thus be bled from the turbine stages, an increased flow of steam to the condenser 42 will occur for the same steam input through the valve 40 as compared with an arrangement involving the use of an additional bleed connection to a condensate heater, and the additional steam flow through the turbine stages subsequent to connection 49 will generate more power for the same initial steam input.

The aerodynamic turbine section included in the binary fluid power plant system has an air turbine 80 operating with high pressure high temperature air, which upon expansion to a lower pressure and temperature, yet still above atmospheric pressure and temperature, is utilized as a combustion constituent in the furnace 1 to which it flows through conduits 81 and 5, and the interposed heat exchanger 24.

The air used as a motive fluid in the aerodynamic turbine 80 is introduced into the system at inlet 82 of an axial flow type compressor 83 which is driven by the aerodynamic turbine 80. The air compressed in the first stage of compression, is also raised in temperature as the result of the compression work. The heated compressed air is then directed by conduit 84, valve 85 and conduit 86 through the heat exchanger 70, where the air temperature originating in the hotwell 56. The air is then directed by conduit 87, valve 88, conduit 89, and valve 90, to the inlet 91 of a second stage air compressor 92 which raises the air temperature is reduced by heat transfer to the condensate of lower temperature originating in the hotwell 56. The air is then directed by conduit 87, valve 88, conduit 89, and valve 90, to the inlet 91 of a second stage air compressor 92 which raises the air to the desired final pressure with some rise in air temperature. The air flows through conduit 93, valve 94, and conduit 95 to the inlet of the high pressure air heater comprising the low temperature section 17 and the high temperature section 9. The connections 100 and 102 with interposed valve 101 introduce the high temperature high pressure air to the air turbine in which it is expanded to do useful mechanical work, the turbine exhausting through the conduit 104 and valve 105 to the conduit 81.

By the use of condensate interstage air cooling in connection with the multiple stage compressor, an advantageous recovery is made of substantially all of the inter-cooler heat which is usually of the order of 30% of the heat input into a gas turbine or aerodynamic plant cycle, while at the same time the efficiency of the compressor is improved over what it would be without interstage cooling of the air. Such interstage cooling of the air has the additional advantage of aiding the fuel fired combination superheated steam generator and high pressure air heater to operate with a relatively low stack temperature and high thermal efficiency, in that the compressed air delivered from the final stage of the compressor through conduit 95 to the low temperature air heater 17 is maintained at a temperature sufficiently below the temperature of the heating gases at the air heater that an economic design of air heater, with respect to extent of surface and draft loss, is permissible in attaining the desired gas temperature reduction. The use of the boiler feed water condensate for compressor interstage air cooling thus contributes to the attainment of high heat absorption efficiency of the fuel fired steam generator and high pressure air heater along with improved overall thermal efficiency of the power plant.

By heating the air to a sufficiently high temperature while maintaining a substantial super-atmospheric pressure, sufficient heat will be introduced into the air to provide upon expansion in the air turbine an excess of power over and above that required to drive the multiple stage air compressor, and the excess so developed is utilized to generate electrical energy by the generator 110 directly connected to the air turbine shaft. This excess of power delivered to the station bus bars through connections 111, when added to the power generated by the steam generator 43, will be the combined gross plant power output. Deductions are necessary in determining the net plant output, these being power for the condenser circulating pumps, condensate and boiler feed pumps, primary air fan and pulverizer. In the arrangement disclosed, where the furnace and heating gas passes are operated at a pressure sufficiently above atmospheric pressure to overcome the draft loss, no induced draft fan is necessary.

In the arrangement disclosed by Fig. 1, the compressor being the source of pressure combustion air for the furnace, must be placed in operation before there is any heating of the air to be supplied to motivate the air turbine. A starting motor 98 served by electrical connections 99, is provided to turn over the compressor and the connected air turbine until such time as the air from air heater 9 is of sufficient pressure and temperature to produce the required driving power by the air turbine. In starting, multiple stage compression is not necessary, so valves 85, 88, 97 and 96 are provided to permit operation at low pressure without inter-cooling. At the same time the valved bypass 103 around the air turbine may be opened to pass air directly from the outlet of heater 9 to the furnace without passing through the air turbine.

During the starting period, the dampers 15 are desirably restricted so that the heating of the air may be controlled until such time as the combustion conditions in the furnace are stabilized and there is sufficient flow of heating gases over and above the amount required for steam generation and super-heating to preheat the air to an operating temperature.

The air-feed water heater 24 is provided to reduce the temperature of air exhausted from the air turbine 80 through conduit 81 by transfer of heat to the economizer feed water when the exhaust air temperature is higher than desirable for proper furnace operation. The heater 24 may be bypassed through the use of a valved bypass connection 5' between conduits 81 and 5, when the temperature of the exhaust air from the turbine 80 is suitable for the desired combustion conditions.

*Binary fluid power plant with inter-cooler regulation*

Figure 2:
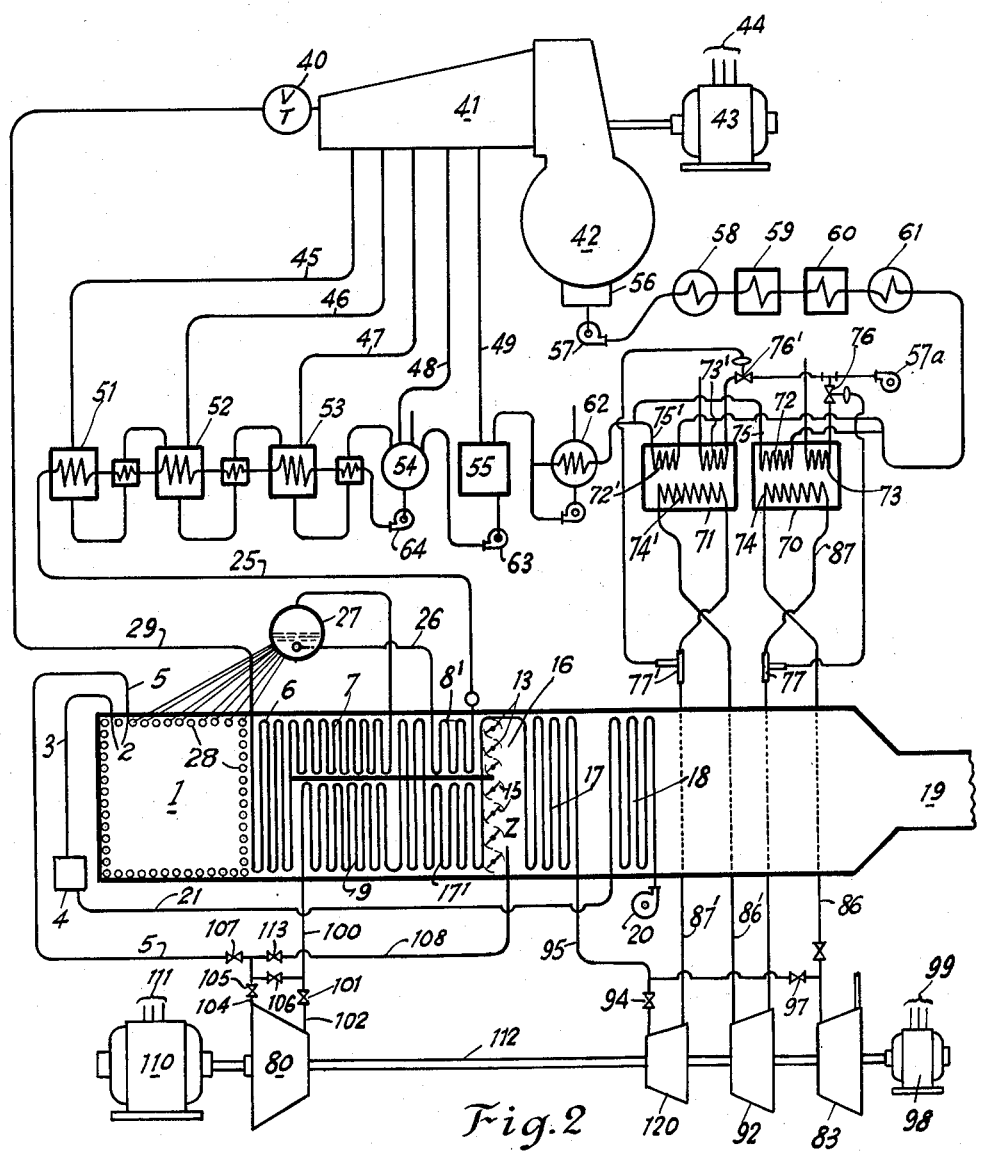
Fig. 2 illustrates diagrammatically a modification of the system shown in Fig. 1 with respect to compressor intercoolers and the regulating apparatus for the same.

In Fig. 2 is illustrated a modified binary fluid power plant of the type indicated in Fig. 1 with a construction of the heat exchangers used for inter-stage cooling of the air being compressed permitting an effective regulation of the inter-stage cooling effect over a wide range of plant operation.

In this arrangement three stages of air compression are provided by compressor units 83, 92 and 120, and air inter-coolers 70 and 71 are arranged between compressors 83 and 92 and between compressors 92 and 120. The air under super-atmospheric pressure and temperature leaving the respective compressors is cooled in the inter-coolers by either condensate or by service water or partly by each, to the desired outlet temperature. Heat is abstracted from the heated air in the coil 74 of the inter-cooler 70 first by tubular heat exchange surface 72 through which condensate from condenser 42 is forced by hotwell pump 57. The air introduced into the inter-cooler may also be cooled by auxiliary tubular heat exchange surface 73 through which service cooling water may be directed from a service pump 57a. From the outlet 75 of the condensate cooled surface 72 of inter-cooler 70, the condensate is directed through the after-cooler 62 to open feed water heater 55.

A second inter-cooler 71 is arranged in parallel with respect to condensate flow. Conduit 86 connects the discharge of the low pressure compressor 83 to the inlet of inter-cooler 70 and conduit 87 connects the air outlet of the inter-cooler 70 to the inlet of the intermediate compressor 92. Conduit 86' connects the air discharge of compressor 92 to the inlet of the second inter-cooler 71 and conduit 87' connects the air outlet of the inter-cooler 71 to the inlet of the high pressure compressor 120. Inter-cooler 71 is also constructed with both condensate and service water cooled surfaces 72' and 73' respectively corresponding to inter-cooler 70. Outlet connection 75' directs condensate from surface 72' to the open feed water heater 55.

By the described arrangement of inter-cooler heat exchange surfaces it is possible to cool the air introduced into each inter-cooler solely by either condensate or service water, or by both simultaneously.

In the combination power plant described it is advantageous from a thermal efficiency standpoint to absorb as much of the inter-cooler heat into the feed water cycle as possible, and to do this as much heat as possible should be transferred by the inter-coolers 70 and 71 to the condensate from pump 57. As will be hereinafter explained, under certain plant loading conditions an insufficiency of condensate to adequately cool the air flowing through the inter-coolers may occur and for such conditions the auxiliary service water cooled inter-coolers 73 and 73' are brought into action in order to reduce the temperature of the air leaving the inter-coolers 70 and 71 to the desired temperatures at the inlets of compressors 92 and 120. To effect this modification of the inter-cooler operation, particularly under rapidly changing load conditions, the automatic thermostatically controlled valves 76 and 76' are provided in the service water supply lines to exchanger surfaces 73 and 73' and the operation of these valves is effected by a determination of temperature in the air outlet conduits 87 and 87' of the inter-coolers by temperature responsive devices 77 and 77' respectively. The temperature responsive devices 77 and 77' consist of gas-filled bulbs inserted through the walls of conduits 87 and 87' and connected by capillary tubes to the expansible diaphragm chamber of the valve operating mechanism for valves 76 and 76' respectively. When, as for example, due to a reduction in flow of condensate to surface 72, the air introduced through conduit 86 is not reduced to the desired predetermined temperature at the position of temperature device 77, the temperature-responsive device will cause valve 76 to open to an extent permitting the flow of sufficient water through surface 73 to reduce the outlet air to the desired temperature. Should the condensate flow increase after the valve 76 is partly open, then the device 77 will operate to automatically reduce the service water flow.

When service water flowing through surface 73 absorbs heat from the air and the water is wasted, a heat loss from the thermal cycle occurs and the use of service water is therefore minimized. The thermostatic control of service water inter-cooling of the compressed air is an important factor in maintaining optimum thermal efficiency operating conditions under variable load and condensate flow rates. The optimum temperatures for the air streams leaving the respective inter-coolers 70 and 71 through conduits 87 and 87' are dependent on the design characteristics of the multiple stage compressor plant, and the desired air temperature to the inlet of the pressure air heater 17.

After leaving the inter-cooler 71 the cooled air under pressure is introduced to the inlet of the high pressure compressor 120 and is compressed to a working pressure of the order of 90 p. s. i. absolute and a temperature of approximately 187 F. at which it is introduced into the low temperature closed air heater section 17 and heated by products of combustion flowing from the furnace 1. In the Fig. 2 arrangement after being heated in the low temperature section, the air is passed through an intermediate air heater section 17' and then through a high temperature section 9, from which it is discharged through conduit 100 at a pressure of approximately 80 p. s. i. a. and a temperature of approximately 1335 F.

The high temperature air flowing in the conduit 100 is thus at a pressure and temperature sufficient to generate power upon expansion through the multiple stage aerodynamic turbine 80 driving the electric generator 110 and the compressors 83, 92 and 120 through a connecting shaft 112. As in the method of operation described in connection with Fig. 1, all of the air may be exhausted from the turbine at a pressure slightly above atmospheric to create a pressure in the furnace 1 sufficient to overcome the draft loss over the convection heated surface, including the steam generating tubes 28, superheater sections 6 and 7, and an economizer 8', or alternatively a portion of the air exhausted from the turbine at a temperature of the order of 700 to 800 F. may be exhausted directly through a conduit 108 controlled by a valve 113 to a rearward position in the heating gas pass, as for example the chamber 16 or zone Z, where the products of combustion are at a temperature considerably below the temperature at which they leave the combustion chamber 1.

The arrangement shown in Fig. 2 is designed for the operation of the compressor, high pressure air heater and aerodynamic turbine at a substantially constant predetermined maximum air flow and capacity, but when the quantity of air is in excess over what may be advantageously utilized for combustion purposes in the furnace 1, a portion will be bypassed as above outlined. The amount of air bypassed from the air turbine exhaust to the rearward chamber 16 through conduit 108 is controllable by valve 113, as the pressure in the chamber 16 is lower than at the final stage exhaust of the turbine or in the furnace 1. The amount bypassed may be determined by the predetermined quantity of air needed in furnace 1 to burn fuel sufficient to liberate the heat necessary to generate and superheat steam for the steam plant and to preheat the air leaving the high pressure compressor stage to the desired turbine inlet temperature and the primary combustion air.

As the fuel requirements are based on superheated steam generation from water discharged from the high pressure heater 51, through feed water line 25, and the heating of air to the optimum turbine inlet temperature, the combustion control must take these two factors into consideration and either a reduction in steam pressure or a lowering of the air turbine air inlet temperature from a predetermined level should cause an increase in fuel introduction. The division of the air exhausted from the turbine into two streams, one flowing through conduit 5 to the burners and furnace to be used as combustion air and the other bypassed to zone Z is controllable by valve 107 and 113 to maintain the proper predetermined fuel-air ratio.

As a means of regulating the distribution of heating gases between the steam superheating and high temperature air heating section, the dampers 13 and 15 which are adjustable in accordance with superheated steam outlet temperature, are provided.

The furnace fluid heating tubes 28 may be used for heating either water, steam or air or a combination of such types of cooling. If the furnace is primarily of steam generating water cooled construction, the steam generation may be in excess of the steam requirements of the steam prime mover on the lower fractional loads on the combined plant when the reduction is taken by reducing the load on the steam turbo-generator while maintaining the maximum rated load on the air turbine. At such reduced load the furnace temperature may not drop as much as in the usual steam boiler furnace as the output of the air turbine requires considerable generation of heat in the furnace. A contemplated method of operation to compensate for such a condition involves a variation in the excess air introduced into the furnace as measured by the theoretical combustion air requirements of the fuel, the lower combustion temperatures with high excess air being utilized to avoid excess steam generation. Lower furnace temperatures through operation with higher than customary excess air ratio is also effective in controlling the gas temperature to the convection heat absorbing surfaces of both the superheater and high temperature air heater.

*Binary fluid power plant with multiple exhausts from air turbine*

Figure 3:
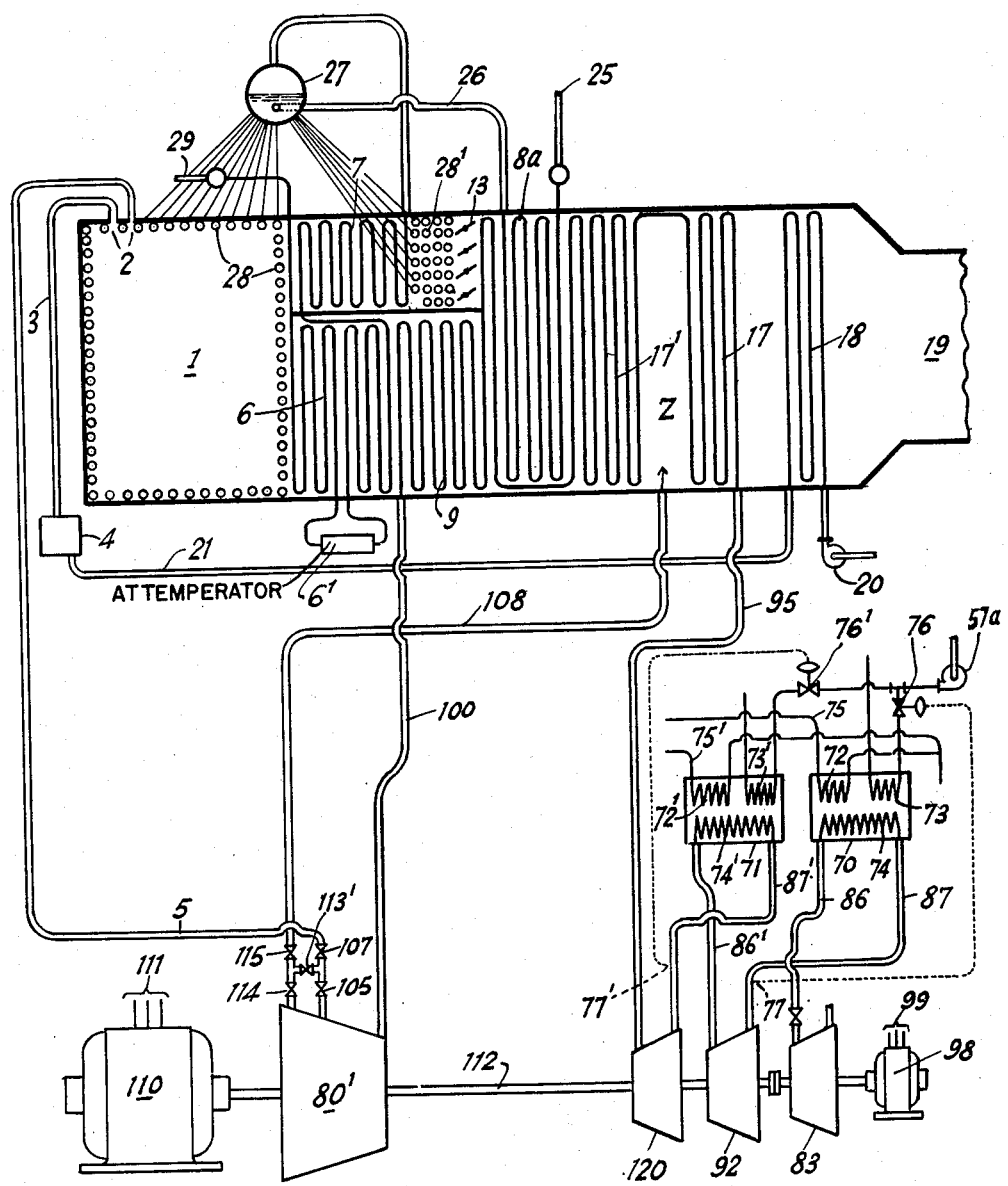
Fig. 3 illustrates diagrammatically a modified arrangement of a portion of the apparatus shown in Fig. 2.

Fig. 3 illustrates a modification of the aerodynamic turbine section of Fig. 2, particularly with respect to the exhaust from the air turbine to the fuel fired heat absorbing unit. It also illustrates a further modification in the arrangement of elements in the fuel fired heat absorbing unit. The condensing steam turbine section (not shown) corresponds to that shown by Fig. 2 and any reference to elements of that section are with reference to Fig. 2.

As the pressure at zone Z of the fuel fired heat absorbing unit is appreciably lower than that in the furnace 1 due to the draft loss across the convection heating surface, this pressure drop, which in the Fig. 2 arrangement is accomplished by throttling valve 113, is utilized in Fig. 3 for doing useful work with extraction of heat from the air. As compared with the turbine 80 of Fig. 2, an additional expansion stage is provided in the air turbine 80', so that the exhaust air passing to the furnace 1 is withdrawn from the turbine at a point between the last two turbine stages, while the exhaust air bypassed to zone Z is taken from the discharge of the last stage through conduit 108 and valve 114 at a lower pressure and a lower temperature than the air going to the furnace. As in the designed operation of the power plant systems of Figs. 2 and 3, the compressor and air turbine handle the same amount of air at fractional loads of the combined plant and in an amount corresponding to the secondary combustion air requirement when the combined plant is at full rated load, the power gain effected by further expansion of the air which is bypassed to zone Z is substantial.

In order to control the division of air flow between the furnace and zone Z, valves 107 and 115 are provided, either or both being connected in operating relation with the control apparatus.

By way of example, the combined steam turbogenerator and aerodynamic turbine plant has been disclosed as adapted for modification of a regenerative steam cycle plant having a 100,000 kw. steam turbo-electric generator operable from a steam supply of 915,000 lb. per hour at 1250 p. s. i. gauge and 900 F. at the throttle, and exhausting to a condenser vacuum of 1 inch Hg absolute. In such a combination, the aerodynamic turbo-generator would have a maximum rated generator capacity of the order of 12,000 kw. with air introduced to the air turbine at 30 p. s. i. absolute and a temperature of 1335 F., exhausting at a pressure of 16 p. s. i. absolute and with an exhaust air temperature of about 775 F. to the conduit connection to the furnace. With the arrangement shown by Figs. 2 and 3, the quantity of air passed through the air turbine cycle is maintained substantially constant and approximately 80% of the total combustion air requirements for fuel burning with 20% excess air, the remaining 20% being provided by the primary air blower.

With a rated steam turbo-generator output of 100,000 kw., the air flow through the compressor and air turbine will be approximately 850,000 lb. per hour, and the theoretical power recovery exclusive of bearing and generator losses from the air turbine driven electric generator will be approximately 12,000 kw., giving a combined plant rated generator output of approximately 114,000 kw.

Figure 4:
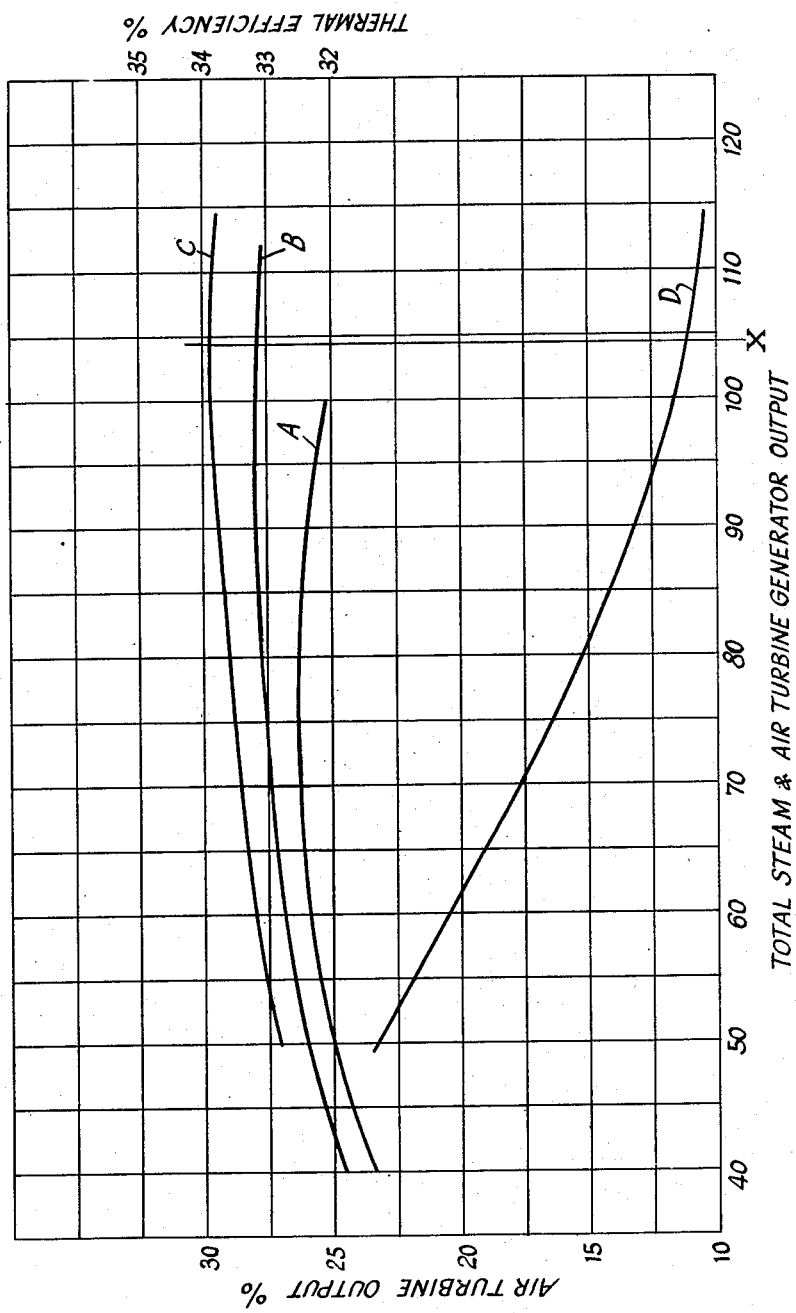
Fig. 4 shows graphs of thermal performance of the combined plant and a basic steam plant.

The curves shown in Fig. 4 give the calculated thermal performance of a combined plant constructed in accordance with my invention as compared to the basic steam turbo-electric plant, and illustrate factors related to the apparatus and its method of operation. The base coordinates are values of combined or total steam and air turbine generator outputs, while the thermal efficiency values are indicated to the right of the curves A, B, and C to which they apply, while the percentage ratio of air turbine generator output to total plant generation are given by the values to the left of the curve D to which they apply.

Curve A shows the thermal efficiency-rating relationship of the basic regenerative steam turbine plant over a rating range from 40 to 100% of its rated load, based for purpose of comparison on a constant boiler and furnace efficiency with a stack gas temperature of 321 F. This curve illustrates the variation of efficiency at fractional load. This curve is based on the steam plant having a low pressure stage condensate heater connected to bleed connection 50 in place of inter-coolers 70 and 71.

Curve B shows the thermal efficiency-rating relationship of a combined steam and aerodynamic turbine plant with the entire inter-cooler heat taken out of the system by service water, the load range being extended beyond that of the basic steam plant due to the additional power generation by the air turbine. This is based on a constant boiler and air heater efficiency with a stack gas temperature of 405 F.

Curve C shows the thermal efficiency-rating relationship of a combined steam and aerodynamic turbine plant with constant boiler and air heater efficiency conditions based on a stack gas temperature of 405 F. and with the entire inter-cooler heat absorbed by condensate of the steam plant cycle for a range of load from the maximum down to load "X" and at lower loads with the inter-cooler heat absorbed partly by condensate and partly by service water, the proportion of the latter increasing with decreasing plant load. The thermostatically controlled valves 76 and 76' regulating the introduction of service water cooling to inter-cooler heat exchange surfaces are arranged to become effective at and below load "X," and due to the increasing quantity of service water inter-cooling used at lower loads the combined efficiency will be materially reduced and the curve C tends to converge with curve B and also with respect to the efficiency curve A of the steam plant.

Curve D illustrates the proportion of the total combined plant power output attributable to the air turbine set. It will be noted that with the operation of the air turbine at constant rating, while the load on the steam prime mover is decreased, the air turbine set will be producing 20% of the power at combined loads of 60% of maximum load of the steam prime mover. The more efficient air turbine set is thus utilized to its full extent and although the combined efficiency drops with loads below "X," when service water inter-cooling becomes necessary, the higher proportion of the load carried by the air turbine at fractional loads is an effective factor in giving a wider load range of improved thermal economy.

Although the plant example cited above is based on an air temperature of approximately 1335 F. entering the air turbine, a still higher air temperature as permissible by the metals available for high temperature use in the heat exchange equipment and in the air turbine will have several advantages. For example, with a temperature of the air entering the air turbine of the order of 1500 F., approximately 9% more power will be produced as compared with an inlet air temperature of 1335 F. The resulting higher air turbine exhaust temperature of approximately 900 F. will be advantageously utilized in the furnace where the adiabatic combustion temperature will be raised approximately 70 degrees F. to increase the furnace temperature in the order of 35 degrees F. Such a higher furnace temperature results in only a negligible increase in the temperature of the gases discharged to the stack, while the higher temperature heat potential will give a higher radiant heat absorption and a flatter temperature curve for the convection heated heat transfer surfaces with variations of rating.

A high temperature gaseous fluid turbine exhausting to a furnace where the temperature of the gases is raised by burning fuel and the products of combustion are utilized in radiant and convection heat transfer for the heating of a liquid or gas, is thus of particular advantage in attaining high overall thermal efficiencies. The use of a separate expensive regenerator type of heat exchanger in the exhaust from the turbine to recover heat from the gases discharged to the atmosphere is thereby avoided.

The steam generating and superheating and air heating apparatus suitable for use in the described combined plant will differ from the conventional boiler in that with the scheme of operation utilized with the arrangement of apparatus of Fig. 2, provision is necessary for effecting the desired uniform superheat steam output at decreasing loads on the steam prime mover while maintaining a uniform heating of a substantially constant quantity of air to the air turbine. The rate of steam generation will thus vary at a greater rate than the rate of heat liberation in the furnace and the weight of the products of combustion. To accomplish the desired results an arrangement of water, steam and air heating surfaces as indicated in Fig. 3 is desirable.

Inasmuch as the weight of the products of combustion will not decrease with decrease of load as rapidly as the steam flow, the amount of heat available at high temperature levels for superheating is greater per unit of steam flow at lower loads than at the higher loads on the steam prime mover, and utilization of this higher proportion will tend to maintain a uniform degree of superheat when steam flow is decreased.

To effect a further regulation in superheat and the quantity of steam generated as may be required, the construction of the heat absorbing unit shown in Fig. 3 provides for a division of the gas flow from the furnace into two streams, one stream passing across a primary superheater section 6 which is arranged in series gas flow with the high temperature outlet section 9 of the air heater, while the other stream passes over a secondary section 7 of superheating surface, and a steam generating boiler section 28', with both streams passing over an economizer section 8a arranged ahead of an intermediate air heater section 17'. The steam generating section 28', shown diagrammatically in Fig. 3, is connected into the steam boiler circuit in a manner corresponding to the arrangement of section 428' in the heat absorbing boiler and air heater shown in Figs. 6 and 7, as hereinafter described. At high steam plant loads the products of combustion will divide as above providing the maximum of steam generation and superheating, while with decreased load the control dampers 13 will be operated to effect a reduction in the quantity of hot gases flowing in the second stream, whereby both the effectiveness of the secondary superheater 7 and the boiler section 28' will be reduced. As the gas flow over the primary superheater section will be maintained at a higher proportional rate to steam flow than at the higher load, an increased superheating effect will be attained therein whereby substantially uniform superheat will be attained with variations of steam plant output. If minor secondary adjustment of the degree of superheat is necessary a thermostatically controlled steam attemperator of the spray type may be introduced into the flow path of the primary superheater to give the desired further regulation of steam delivery temperature. Such an attemperator of the type shown by Rowand et al. Patent 2,421,761, is indicated at 6'.

Quite apart from the control of the distribution of heat absorption to the steam generating, steam superheating and air heating surfaces by means of control of gas flow as above outlined, a further means of effecting a variation in the proportion of heat absorbed to the different surfaces may be accomplished in the combined plant by a variation in the temperature of the furnace gases as well as their quantity through regulation of the excess air introduced into the furnace with combustion air. An increase in excess air will effect a reduction in furnace temperature thereby reducing the amount of heat absorbed radiantly by the steam generating or fluid heating furnace wall surface, while at the same time increasing the quantity of products of combustion passing over the subsequent convection heated surfaces, so that superheating and air heating by convection will be in a greater ratio to the steam generation. Variation in excess air may be readily effected through the control of the division of the air exhausted by the air turbine into the two streams, one to the furnace as secondary air through conduit 5, and the other through conduit 108 to the rearward zone Z of the air heater pass.

*Combined fuel fired steam generator and high temperature air heater*

Figure 10:
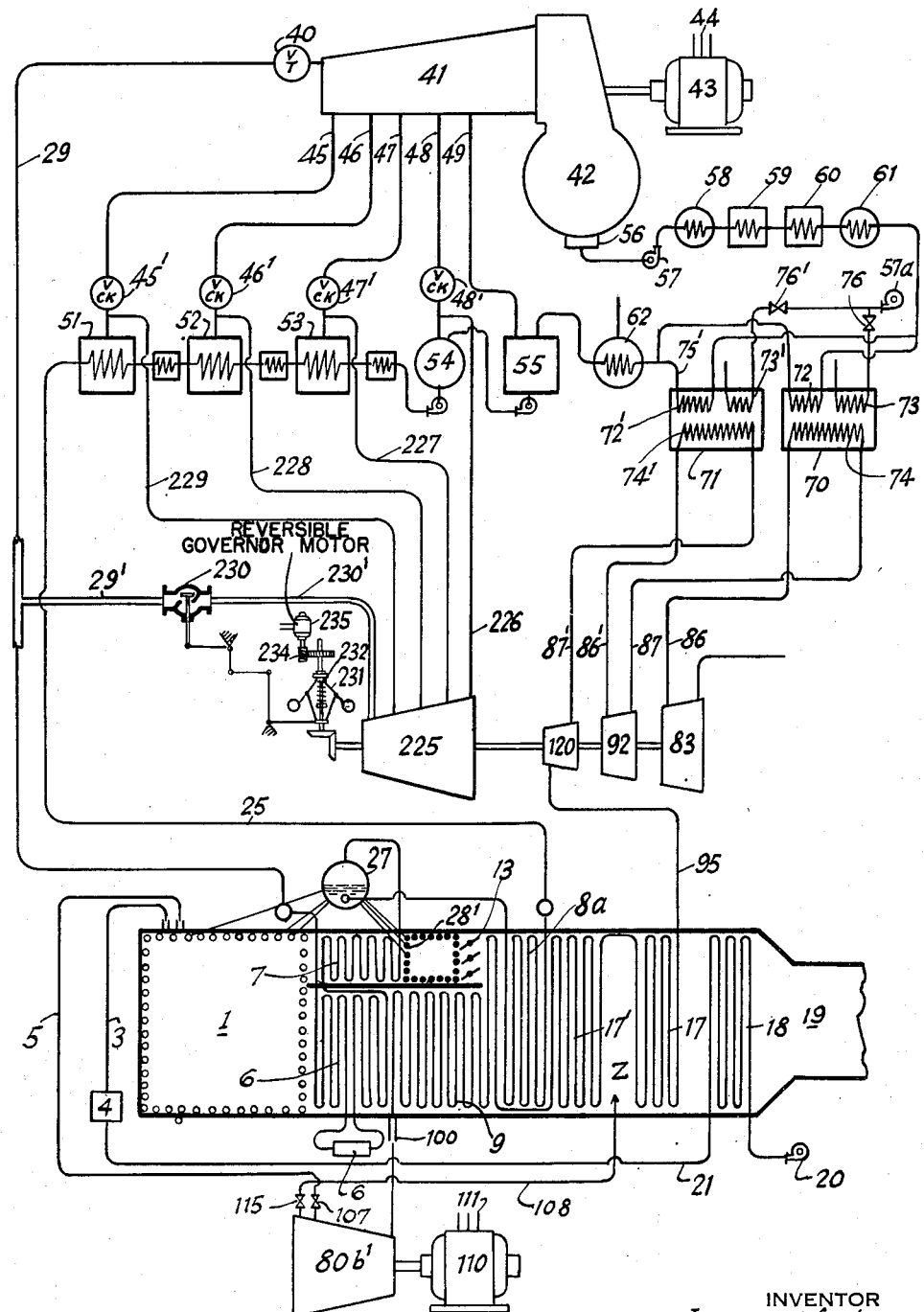
Fig. 10 illustrates a modified arrangement involving a non-condensing steam turbine drive for the compressor set.
Figure 11:
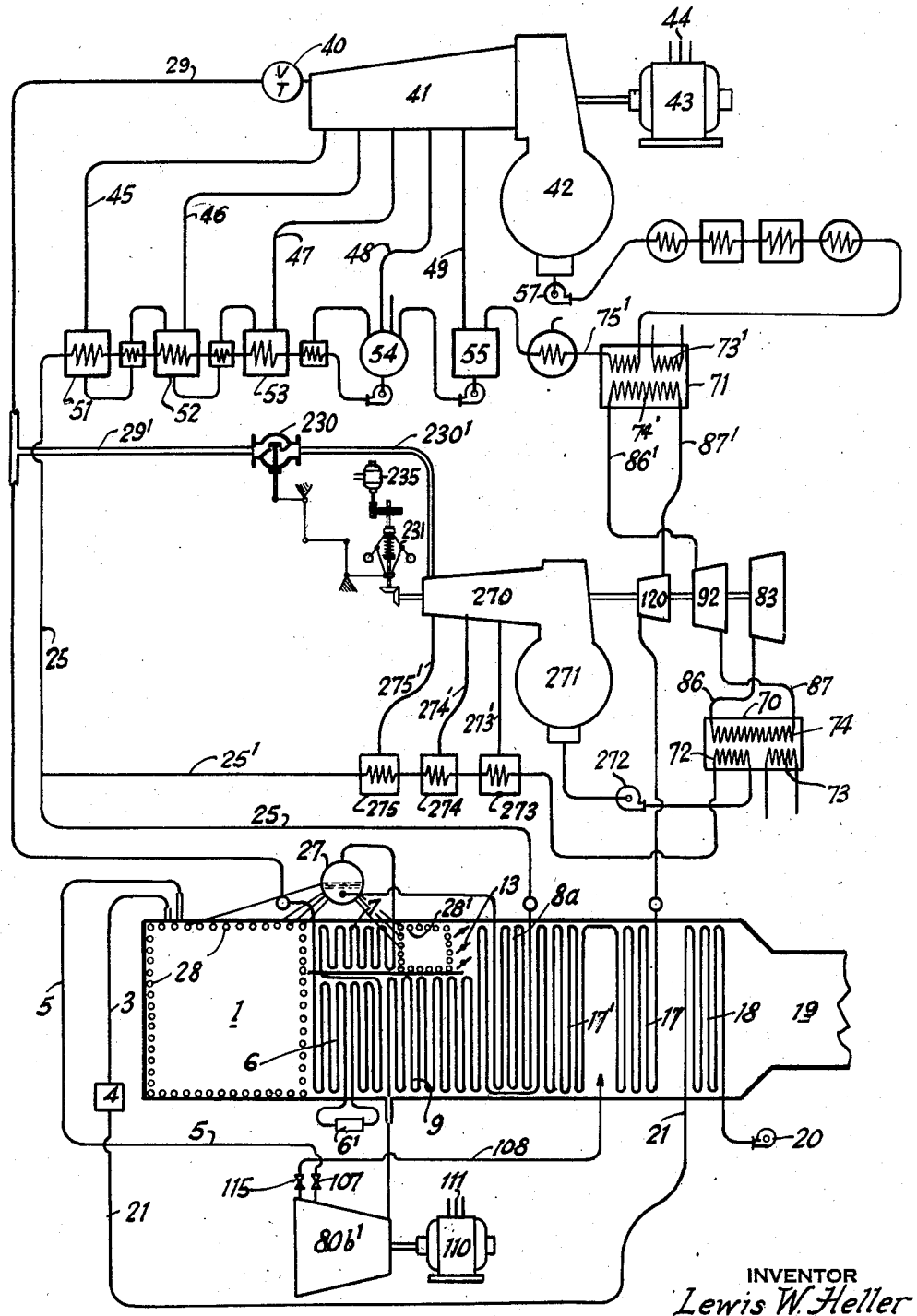
Fig. 11 illustrates a modified arrangement involving a condensing steam turbine drive for the compressor set.

Figs. 5, 6, 6A, 7 and 7A illustrate one form of the fuel fired heat absorbing unit depicted diagrammatically in Figs. 3, 10 and 11. This unit is arranged to receive a continuous supply of feed water from the regenerative feed water heating portion of the steam power plant and one or more streams of air under super-atmospheric pressure from the discharge of a compressor set, and by the burning of pulverized coal to generate high pressure superheated steam for the steam plant and also heat the air under a substantial super-atmospheric pressure to a temperature from which expansion to approximately atmospheric pressure will produce useful power in excess of the power requirements of the compressor set.

Inasmuch as my combined steam-air turbine plant requires heated air at or above 1200 F., and advantageously utilizes highly superheated steam in the steam section, the heat absorbing unit is arranged so that the optimum steam superheat and air temperatures may be attained, through the positioning of surfaces with respect to the heat generating furnace and by the regulation of heating gas flow over the respective surfaces.

Figure 5:
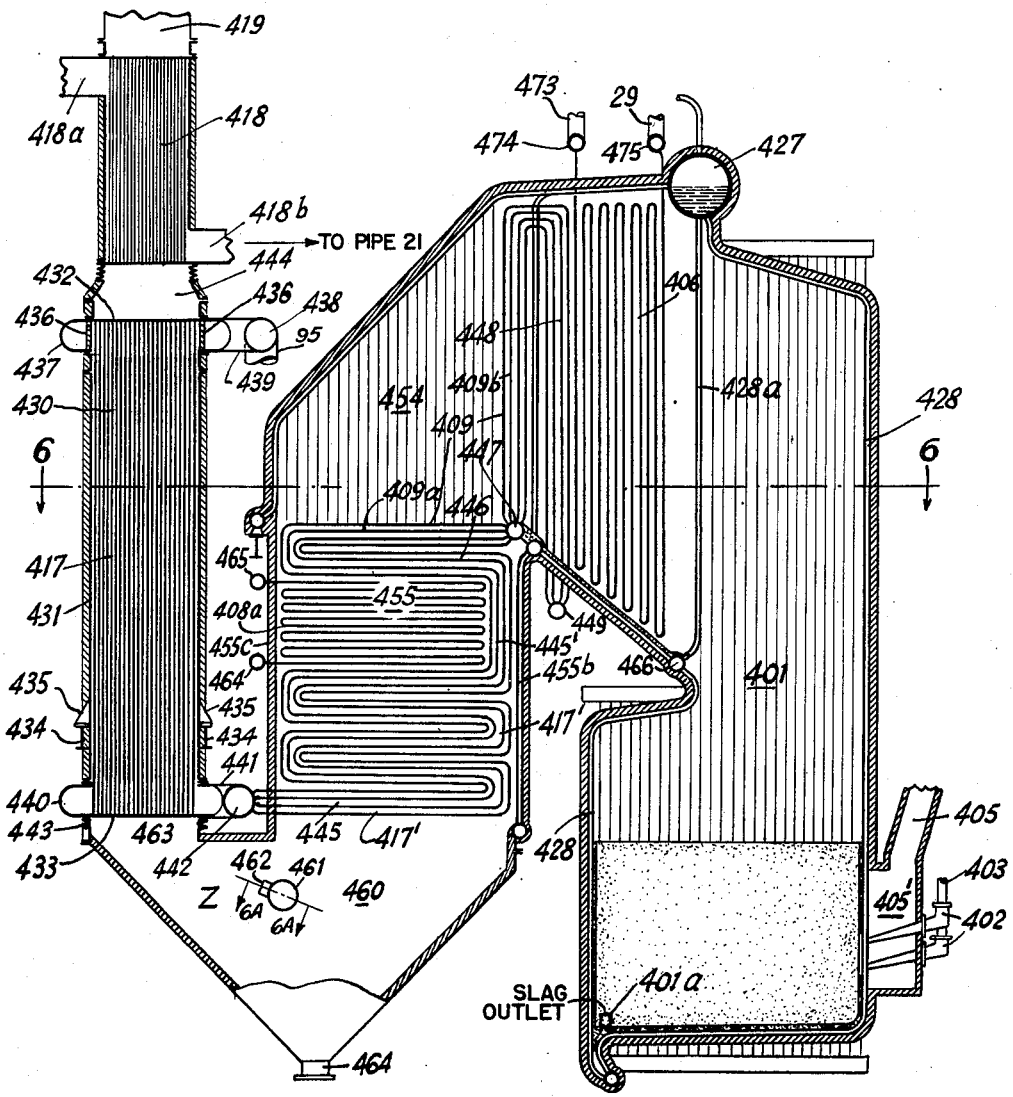
Fig. 5 is a sectional elevation of a heat absorbing unit constructed in accordance with my invention.

In the construction shown by the sectional elevation of Fig. 5, a pulverized fuel burning furnace 401 is fired by a plurality of pulverized fuel burners 402 spaced transversely of the furnace and extending through a secondary air chamber 405' to direct streams of air-borne pulverized fuel received from one or more pulverizers, not shown, through burner lines 403, between spaced furnace wall cooling tubes 428. The secondary combustion air is supplied by one or more conduits 405 and is not only under super-atmospheric pressure but at a temperature substantially higher than atmospheric.

The furnace is formed with gas tight fluid cooled walls and a fluid cooled floor adapted to collect and retain a shallow pool of molten ash originating from the fuel and discharging through slag outlet 401a. The fluid wall cooling tubes 428 in the present instance are water tubes arranged with water supply connections from and discharge connections to the elevated steam and water drum 427 of the boiler. Fluid cooling tubes conveying air or steam may be used in place of some of the water tubes or in combination therewith where radiant heating of the air or steam is desired.

The furnace 401 extends upwardly, being bounded by wall tubes and a screen of tubes 428a across the lateral gas outlet 450 extending between the junction header 466 and the lower portion of the drum. From the furnace gas outlet the rearwardly extending upright partition 451, formed in part of water tubes, divides the horizontally extending convection heating pass into gas passes 452 and 453. At the rear of these passes in which the convection heated tubular elements are located, a gas turning space 454 extending transversely of the unit is provided and a downwardly extending gas pass 455 with additional convection heated elements is arranged to receive heating gases from the horizontal gas flow passes. The walls defining the outer sides of the horizontal gas passes 452 and 453 and the walls of the turning space 454 are made of a gas tight construction adapted to maintain a slightly super-atmospheric pressure within the passes and the space, and they may be advantageously constructed to include water or other fluid heating tubes. The walls of the down flow pass are also constructed to retain a pressure above atmosphere but as the gas temperatures will be lower, fluid heating tubes may be used primarily as structural support elements.

Below the downflow gas pass a gas-tight refractory walled hopper bottom chamber 460 is arranged as a gas turning space, a gas and air mixing chamber and an ash separating and collecting space. A final upflow gas pass is partly formed by a plurality of transversely spaced circular gas outlet passages 463 opening to the upper rear end of the chamber 460 and each containing a tubular air heater 417. A common breeching 444 joins the passages 463 to the casing of a primary air heater 418. From the top gas outlet of the primary air heater 418, the heating gases originating in the furnace are delivered through a connector 419 to a stack discharging to atmosphere.

When a feed water economizer is used to heat the boiler feed water from the temperature at which it is discharged from the regenerative heating system of the steam turbine to or approaching the saturated steam temperature in the drum, such a feed water economizer 408a may be arranged in the downflow gas pass 455, with the lower inlet header 464 receiving the feed water. The economizer consists of a plurality of laterally positioned multiple loop tubular elements extending across the gas pass and connected at their upper ends to outlet header 465 which is in turn connected to the water space of the steam and water drum with the customary flow regulating devices.

Water supply connections from the water space of drum 427 are provided to the lower headers for the wall tubes 428. Through transverse junction header 466 and headers 467 and 468, the convection heated steam generating tube bank located in gas pass 453 receives a supply of water to the lower end of its L-shaped tubes 428', as shown in Fig. 7. The upper ends of the furnace wall and gas pass wall tubes are connected directly or through suitable junction headers to deliver steam and water to the drum 427.

The steam which is separated from the water in drum 427 passes through connectors 470 to an inlet header 471 of the secondary superheater 407 consisting of a plurality of multiple loop elements pendantly positioned in gas pass 453 and the steam passing through the elements is collected by transverse outlet header 472. A connecting pipe 473 joins the outlet header of the secondary superheater with the inlet header 474 of the primary superheater 406 in gas pass 452. Superheater 407 is the regulating superheater while superheater 406 having a much greater amount of heat absorbing surface does the major portion of the superheating of the steam delivered by the drum. From outlet header 475 a pipe 29 conveys superheated steam to the steam consumers, of which the steam turbine 41 of the combined plant utilizes the major portion. As a means of controlling steam temperature in order to prevent overheating of tubes of the superheater 406 and also for regulating superheated steam delivery temperature, an attemperator may be introduced intermediate the length of the flow paths of the multiple loop tubular elements which form the heat absorbing surface of the primary superheater.

In the heating of air for utilization in the air turbine at a substantial superatmospheric pressure and a temperature above 1200 F., heat transfer surface consisting of tubular elements is so arranged that a minimum pressure drop will occur in the passage of the air from the inlet to the low temperature heaters to the air outlet of the high temperature heater, while at the same time the air heating surfaces are so arranged that they may be economically constructed.

As an alternate construction, the convection superheater 406 may be replaced as a whole, or in part, by radiant absorption superheating elements, as indicated by tubes 6a in Fig. 13, in which case the high temperature air heater portion 409b, which will be described hereinafter, will be brought closer to the furnace and subjected to much higher gas temperatures.

As arranged in the apparatus shown by Fig. 5, the high pressure air heating surface is divided into low, intermediate and high temperature sections which are serially connected for air flow in counterflow relation to the heating gases. The low temperature inlet section is formed by the three upright straight tube heaters 417, receiving air at their upper ends from the discharge of the last stage compressor with the air flowing about the outside of gas flow tubes and discharging at the lower end thereof to the inlet manifold of the intermediate section 417', which is formed by a plurality of laterally spaced multiple loop tubular elements through which the air flows. The high temperature section 409 is in the present instance formed in two portions, the inlet portion 409a being located in the down gas pass 455 directly above the economizer 408a and the serially connected outlet portion 409b in the horizontal gas pass 452 at a position rearward of super-heater 406. The high pressure air heated to the operating temperature by the high temperature section is delivered from outlet manifold 449 to the inlet of the air turbine for expansion and power generation.

The low temperature air heater section is divided into three separate units 417 for structural reasons inasmuch as they handle air under a substantial superatmospheric pressure. Each unit 417 consists of a closely spaced bank of upright tubes 430 arranged within a pressure restraining external metal casing 431, the tubes being secured at their upper and lower ends into perforated tube sheets 432 and 433 respectively. The unit is supported from structural members 434 by a plurality of brackets 435 rigidly connected to the casing so that any expansion of the casing with increase in temperature is upward from the level of the supports.

The upper tube sheet 432 is supported from the upper end of the casing 431 by a number of circumferentially spaced struts 436 so that the load of the tubes pendant from the upper sheet is carried on the casing. The pressure air inlet to the intertube spaces is formed by a circular bustle 437 of semi-circular section, and the pressure air delivered from the compressor through conduit 95 is introduced through a transverse manifold 438 which has lateral connections 439 to the individual bustles 437. The air enters radially inward and flows downward in the tube bank to an outlet comprising an annular bustle 440 and then through lateral connections 441 to a common transverse manifold 442 connected to the air inlet ends of the multiple loop tube elements 445 of the intermediate pressure air heater 417'. An expansion joint 443 is annularly arranged about each outlet opening 463 and connects each outlet with the lower tube sheet 433 of each unit. The gas leaving the outlets 463 enters the tubes at the lower ends and leaves at the upper end of each unit to enter a common transverse breeching connection 444 which joins the gas outlet streams of the three units together for passage through the primary air heater 418.

As the hot gases flowing in the tubes heat them to a temperature higher than that experienced by the casing, the differential elongation will be taken care of by the flexing of the lower sector of the annular bustle which extends from the outer edge of the circular tube sheet 433. By this construction an air heater can be economically constructed for heating relatively large quantities of air under pressures above atmosphere and the heating surface is so proportioned with respect to the gas flow passages that plugging by ash, etc. is avoided. The construction also lends itself to the attainment of good air temperature rise without undue air pressure drop from the inlet to the outlet.

The transverse manifold 442 constitutes an inlet chamber to which the plurality of transversely spaced tubular multiple loop air heating elements 445 of the intermediate heater 417' are connected. Elements 445 are of relatively small size and are spaced with intertube spaces to give an effective convection transfer of heat from the downwardly flowing gases about the tubes. The bank of elements 445 extends from side to side of the down gas pass 455 as defined by side walls 455a, front wall 455b, and rear wall 455c.

The upper outlet ends of the elements 445 are individually connected by vertical tube portions 445' located in the gas pass 455 to the lower inlet ends of the high temperature section 409a of the heater tubes 446. A junction manifold may be used as an alternate construction but a direct tube to tube construction is preferable. The horizontally extending elements 446 are of reverse bend type and are transversely spaced between walls 455a of the downflow gas pass 455, the uppermost tube lengths being adjacent the gas turning space 454 and receiving radiant heat from the gases in that space. The forward air outlet ends of tubes 446 connect to a transverse junction manifold 447 extending the full width between walls 455a.

The outlet portion 409b of the high temperature section is made up of a plurality of serially connected vertically extending inverted U-shaped tube lengths 448 receiving air from manifold 447 and delivering heated air to outlet manifold 449. Tubes 448 are transversely spaced between the sides of the gas pass 452 which is narrower than the downflow gas pass 455. The air discharged from manifold 449 is at operating pressure and temperature and is directed through a conduit 100, shown in the combined plant diagrams, to the air turbine for expansion therein.

Partion 451 dividing the horizontal gas flow passes 452 and 453 is made up of a row of spaced vertical extending water tubes connected into the circulation of the boiler with intertube space closures of refractory held in place in the customary manner. The detail arrangement of the partition is shown by sectional elevation of Fig. 7A.

The gas turning space 460 is proportioned to give a reduction in gas velocity permitting the gravity separation of ash particles for collection in the lower portion of the hopper bottom and periodic removal through sealed ash removal conduits 464. Space 460 also provides a space at the rear side, adjacent the gas outlets 463 to the low temperature air heaters 417, which is adaptable as the zone Z into which the bypassed air exhaust from the final stage of the air turbine 80' may be directed and mixed with the heating gases flowing into space 460 from the downflow gas pass 455.

The exhaust air bypass conduit 108 from the air turbine 80' (Fig. 3) is connected to a manifold 461 extending transversely within the space 460 at a position laterally of the gas stream discharged from the downflow gas pass 455. This manifold has a plurality of longitudinally spaced discharge nozzles 462 constructed to distribute the air from the manifold in a plurality of separate streams in mixing relationship with the gas flowing from the downflow pass subsequent to the reduction in gas velocity which promotes ash separation. The nozzles are constructed in a manner to discharge divided air streams with a minimum of pressure loss.

The primary air heater 418 positioned to receive heating gases from the breaching connection 444 is a straight tube heater in which the gases flow through the tubes and the air to be heated flows on the outside of the tubes, the air being received from the primary air blower 20 of the system at inlet connection 418a and being discharged after heating by flowing downward about the tubes to outlet connection 418b, which connects to the pipe 21 shown in the combined plant diagram (Figs. 1-3).

With a heat absorbing unit consisting of the combination of steam and air heating surface constructed and arranged in a manner similar to the unit shown by Figs. 5, 6, 7, and 7A, it will be possible to produce superheated steam at the required rate and with the desired degree of superheat temperature control while at the same time heating air under pressure to a temperature at which it can be used to generate a substantial amount of power. The arrangement provides for the generation of high temperature heating gases by the burning of pulverized coal under high temperature ash slagging conditions although it is obvious that other types of fuel may be satisfactorily burned in the furnace to generate the heating gases.

*Control of binary fluid power plant*

In respect to the control of the fuel fired heat absorbing unit of Fig. 3, automatic control means are advantageously provided to coordinate the regulation of related operating variables. Such apparatus has been indicated in a schematic manner by Fig. 8 to coordinate the regulation of the supplies of combustion constituents, i. e. the primary air, fuel and secondary air supplies, with the steam demand and the demand for heating of the high pressure air supplied to the air turbine.

In accordance with my invention, at full rated load of the combined plant when the maximum rate of fuel will be consumed, all of the air passing through the air turbine 80' will be exhausted to the furnace 1 as secondary combustion air for the pulverized coal burners. Under these conditions the heat absorbing unit will be delivering the maximum output of superheated steam, with products of combustion passing in parallel through both the convection passes, thus generating steam in the surface 28' and superheating steam in the secondary superheater section 7 as well as in the primary section 6.

Any reduction in load on the combined plant is advantageously taken care of by varying the operation of the steam prime mover, while maintaining the operation of the more efficient air turbine section substantially constant. A lowering of the steam demand will occur but the total amount of high pressure air to be heated to the predetermined air turbine inlet temperature will remain the same. Fuel requirements will be reduced in accordance with reduced steam demand. With a reduction in steam demand, an incremental rise in steam pressure will occur and this increase is utilized, as is customary practice, as a means to reduce the fuel supply. The reduced quantity of heating gases then produced may still be passed through the two parallel passes, but the quantity passing to the high temperature outlet section of the high pressure air heater would tend to be inadequate for maintaining the previous predetermined air outlet temperature. As one means of increasing the heating gas flow to the air heater section 9, the dampers 13 controlling the flow through the secondary superheater 7 and steam generating section 28' are partly closed, whereby the quantity of gases flowing over air heater 9 will be maintained at the same or a greater value than under full load. The operation of dampers 13 is preferably accomplished through a power actuated device responsive to variations in temperature of the air leaving air heater section 9.

Under this set of conditions the primary superheater will be handling less stem than under full load and with a flow of heating gases at slightly lower temperature. The compensating rate of heating gas flow over the air heating surface delivers heat to the high pressure air heater to develop the predetermined outlet air temperature. Thus the outlet temperature from the primary superheater section 6 may be slightly higher than under full load conditions, making the inclusion of a thermostatically controlled interstage attemperator desirable. Part of the reduction in steam production will result from lower heat absorption by furnace cooling tubes 28 and lower heat input into the related convection portions of the boiler, while part will be due to the lowered gas flow over the steam generating section 28' in the damper controlled convection pass.

The secondary air to the burners is coordinated with the fuel delivery through control of damper valve 162 to give a predetermined excess air ratio.

With an increase in load from a partial load condition, a reverse operation will take place following the introduction of added fuel in response to the functioning of the steam pressure actuated control.

The described method of control is on the basis that the excess combustion air will be maintained constant throughout the range of variable rating. It may be desirable however to vary the excess air because of factors involved in the combustion of the fuel, or on the other hand, as previously mentioned, the excess air may be varied as means for effecting a regulation of furnace temperature and convection heat transfer to the superheater and air heater. Other things being equal it is, however, advantageous to operate the combined plant with a low excess combustion air.

When the excess combustion air delivered to the furnace is varied within a limited range where combustion conditions are not disadvantageously affected, a variation in the furnace temperature and furnace gas outlet temperature may be effected, whereby radiant heat absorption will be reduced and convection absorption increased upon an increase of excess air. A variation in such temperature conditions can be accomplished with the apparatus hereinafter described where desired.

In the present instance all superheating tubes and air heating tubes are of the convection type, although the outlet portions of the elements of the primary superheater are subject to some radiant heat absorption, even though partially shielded by the row of screen tubes 28. In other possible embodiments of the fuel fired combined steam generator and high pressure air heater, superheating surface and/or air heating surface can be of a radiant absorption type built into the furnace walls and exposed to the radiant heat of the furnace. With such constructions it may be desirable to introduce an excess air factor in the control system whereby excess air will be varied with changes in rates of radiant heat absorption measured in terms of steam or air temperatures. For example, in the Fig. 3 construction, due to the location of the outlet portions of the primary superheater section 6 so close to the furnace, it may be desirable to limit the radiant absorption by that surface by adjustment of the excess air ratio based upon temperature values at either the outlet or an intermediate position in superheater 6.

Fig. 8 diagrammatically illustrates a control system designed for the coordinated control of the various components related to the fuel supply and air and gas flows of the heat absorbing unit shown diagrammatically in Fig. 3 and in detail by Figs. 5–7A. The devices for determining flow, pressure and temperature conditions in the unit and for regulating the various controllable elements are of the Bailey Meter Company type and function individually in a well-known manner, but are combined in a manner to control operating variables effecting the desired coordination in the generation and superheating of steam and the high temperature heating of air under pressure by the products of combustion generated in the common furnace. Such devices and their mode of operation are disclosed in the patents to Johnson 2,074,696, Dickey 2,292,023, and Gorrie Re. 21,804.

A Bourdon tube 150 is connected to the superheated steam line 29 leading from the heat absorbing unit to the steam prime mover to actuate a master air pilot valve 151 to increase or decrease the pressure in the loading line 152 proportionately to the departure of the steam line pressure from a predetermined standard. This loading pressure is transmitted to a relay 153, to which a loading pressure is also transmitted by conduit 157 from air pilot valve 154 positioned by a pressure responsive device, such as a Bourdon tube 155, in accordance with the condition of a temperature responsive device 156 in the air heater outlet line 100 leading to the inlet of the air turbine. A decrease in steam pressure or a decrease in air temperature will act to produce an air loading in line 158 leading to the actuator 159 of the pilot valve 160 controlling the position of the power piston 161. Damper 162 is located in the primary air conduit 21 leading from the primary air blower 20 to the pulverizer 4. With a decrease in steam pressure or air temperature, the damper 162 will be moved by the piston to admit more primary air to the pulverizer and thereby convey a great quantity of air-borne fuel through burner pipe 3 to the furnace fuel burners.

The secondary air introduction to the furnace from the intermediate stage exhaust outlet of the air turbine is controlled by damper valve 107. Damper 107 is positioned by a power cylinder 168 controlled by air pilot valve 169 actuated by bellows 170 in accordance with the loading in the line 171 from an averaging relay 172. Relay 172 receives a loading pressure through line 175 from relay 152 in accordance with steam and temperature demands and this is readjusted in relay 174 by the loading effect received through line 176 from steam flow-air flow mechanism which operates to adjust the position of the air pilot valve 177 in accordance with the ratio of steam flow to combustion air flow, the air flow being determined by pressure connections 184 and 185 at spaced positions to the heating gas pass of the heat absorbing unit. The steam flow is determined by pressure connections 178 and 179 to the upstream and downstream sides of a flow orifice in the main 29 so that the steam flow mechanism 180 in combination with the air flow mechanism 181—185 and connecting linkage actuates the pilot valve 177 to deliver a loading pressure to effect the desired steam flow-combustion air flow ratio.

The air flow through the air turbine set is substantially constant so that with a uniform air heater discharge temperature, the heat absorbed by the air heater will be substantially constant even though the heat absorbed in the generation and superheating of the steam will vary in accordance with the steam load. The variable factor as regards heat input will be steam flow, so that control of the secondary air in accordance with steam flow-air flow ratio is preferable. As the steam flow will vary at a greater rate than the combustion air for a constant excess of combustion air over theoretical, the control operates over and above a constant base rate of the combustion air flow needed to generate heat for the uniform heat absorption by the high temperature air heater.

With an increase or decrease of fuel introduction, a modification of heating gas flow through the secondary superheater pass is attained through adjustment of the position of dampers 13 by a power piston 191. The position of the piston is controlled by an air pilot valve 192 actuated in accordance with air heater outlet temperature device 156 through the Bourdon tube 155, pilot valve 154 regulating the pressure in line 194 and bellows 193 which positions pilot valve 192. When the temperature of the air rises above a predetermined degree, the power cylinder 191 will increase the heating gas flow area through dampers 13 permitting the generation of additional steam by boiler section 28' and additional superheating by the secondary superheater section 7.

With a decrease of the air temperature below a predetermined degree, dampers 13 will be automatically positioned to provide a smaller gas flow area, while the loading line 157 will act on relay 152 to effect an increase in heat input to the furnace.

With the control arrangement shown in Fig. 8 and operation with a constant quantity of air through the compressor and turbine and the steam prime mover taking variations in electric load, an advantageous combination is provided, in that an amount of air under pressure up to the maximum quantity required for combustion at full load, is instantaneously available for introduction to the furnace under the control of the combustion air control valve 107. With rapid changes of load there will be no delay in increasing or decreasing the combustion air flow in step with the changes in the rate of fuel introduction to the furnace.

As it may be desirable to modify or vary the excess air ratio introduced to the furnace for purpose of temperature control, apparatus is incorporated in the control system which is adapted to modify the excess air in accordance with indications of temperature, flow or pressure. In the specific example, the device is operable to decrease the excess ratio of the combustion air when the temperature of the air at the outlet reaches a predetermined maximum. For this purpose, a temperature responsive bulb 190 is positioned in the air heater outlet conduit 100 and the contained fluid expands with increases in temperature to alter the position of the free end of the connected Bourdon tube 189. The free end of the Bourdon tube is connected to the stem of the air pilot valve 187, whose movement is restricted by an adjustable spring 188, which may be adjusted by a nut 188'. The nut and spring may be so adjusted that the Bourdon tube does not overcome the compression of the spring until a predetermined temperature occurs in the related air conduit 100, but upon higher temperatures the pilot valve is adjusted to introduce a loading pressure through line 186 to relay 172. The additional loading pressure modifies the loading pressure from line 173 developed from the steam pressure and steam flow-air flow control to increase the loading pressure in line 171, whereby a higher air flow to the furnace is permitted by the readjustment of damper 107 than before pilot valve 187 was made operative. The functioning of the excess air readjustment may be regulated by hand adjustment of nut 188' or it may be automatically adjusted in accordance with some selected variable in the operation of the unit.

In the present instance the variable which introduces the modification of the excess air ratio is the outlet air temperature of the air heater 9. If the superheated steam temperature at the outlet of the superheater 6 is to be used as the controlling factor, a temperature responsive element 200 with connected Bourdon tube 201 in steam line 29 would be connected to actuate pilot valve 187.

The above described apparatus of Fig. 8 thus provides for the automatic regulation of fuel input in accordance with variations in steam pressure at the steam turbine inlet from a predetermined value and concurrently adjusts the flow from the air turbine to give a corresponding adjustment of the secondary combustion air delivery to the furnace. A readjustment of combustion air flow is secondarily accomplished based upon any change in the ratio of steam flow to the flow of the products of combustion to restore the air flow-fuel ratio to a predetermined value.

The apparatus also provides for a similar regulation of fuel input in response to drop in the air heater outlet temperature from a predetermined value. In this case, an adjustment of combustion air delivery to the furnace is accomplished in the same manner as if the original control impulse came from a variation in steam pressure.

As a means of proportioning the heat absorption by steam generating and superheating surfaces to the heat absorption by the high pressure air heating surfaces when the steam flow from the former varies while the air flow through the latter remains constant, the control apparatus varies the heating gas flow through the secondary superheater and steam generating surface gas pass of the heat absorbing unit until the temperature of the air delivered from the high temperature air heater in the parallel gas pass is restored to a predetermined value.

Control apparatus responsive to the temperature of the air delivered from the high temperature air heater also provides for the modification of the combustion air supply to the furnace on an increase in the air temperature above a predetermined adjustable value to restore that temperature to the predetermined value.

*Combination plant with variable speed prime mover drive for compressor*

Figure 9:
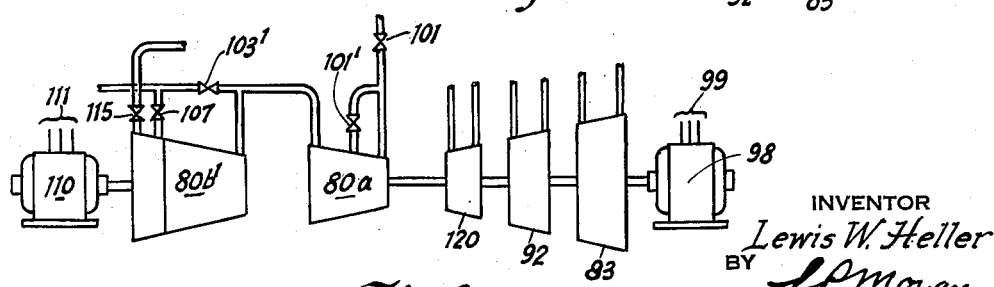
Fig. 9 illustrates diagrammatically a modified arrangement of air turbine drive for the compressor set and the power generator.

In the modified arrangement of apparatus illustrated in Fig. 9, the development of power from the expansion of the highly preheated pressure air is divided into two steps, the air being expanded from air heater outlet pressure through only a portion of the ultimate expansion range in a high pressure air turbine 80a, which is directly connected to the multiple stage compressor and furnishes operating power for that unit only. It is designed for high speed operation of the order of 8000 R. P. M. with the concurrent advantages resulting from high speed operation in both the turbine and the compressor. From the exhaust of the high pressure unit the air is expanded further to the final optimum pressure by a low pressure air turbine 80b' which is directly connected to an electric generator 110, both elements being operative at a constant speed of the order of 3600 R. P. M., permitting the utilization of a two-pole A. C. generator with customary commercial frequency of 60 cycles.

By the above described arrangement it is possible to operate with a variable speed of the high pressure turbine and its directly connected compressor so that optimum operating conditions may be obtained with variable combustion requirements of exhaust air from the low pressure air turbine. One means of effecting the required speed regulation is through an adjustable bypass valve 101' permitting a portion of the air to be bypassed to a lower pressure turbine stage.

With the operation of the compressor set comprising the high pressure air turbine and the multi-stage compressor at a speed of the order of 8000 R. P. M. at full rated load for the combined unit, and at reduced speeds at fractional rates of air delivery, a different set of operating conditions will prevail as compared with constant speed operation with the maintenance of the same air flow and pressure. Reduction in speed will modify the delivered quantity of pressure air and the delivery pressure from the outlet of each stage will be reduced so that the high pressure air entering the low temperature end of the air heater will be reduced.

On the other hand the lower compression ratios resulting from reduced speed will develop lower heats of compression whereby the cooling effect required of the condensate will be lowered and the extent of steam plant load range over which the steam prime mover condensate will adequately serve as inter-cooler water will be greater than with a constant speed compressor set. This characteristic is of importance in effecting maximum operating thermal efficiency of the combined plant when operating at fractional loads.

*Combination plant with non-condensing steam turbine driven compressor*

Fig. 10 illustrates another modified arrangement wherein the variable speed operation of the compressor set, consisting of the compressors 63, 92 and 120, is accomplished by a prime mover independent of the air turbine prime mover, as for example, by a non-condensing steam turbine 225 operating through an optimum speed range commensurate with the design of the compressor set. The steam turbine receives its steam from the main boiler which also serves the main turbo-generator and it exhausts at selected stage pressures into the stage feed water heaters of the main vapor prime mover. The delivery pressure and volume of the compressor set is regulated by variation of the turbine speed through an adjustable variable speed governor controlling a steam inlet governing valve to the turbine.

With this arrangement the proportion of heat absorbed by the steam generating and superheating surface in comparison with that absorbed by the high pressure air heating surface will be higher and this increased proportion provides more flexibility in the construction of the fuel fired heat absorbing unit.

The heat absorbing unit has a sufficient stored reserve of energy so that it is readily responsive to rapid increased demands for steam as occasioned by the increased compressor set speed requirements to supply combustion air. The described arrangement contributes to stability of operation while providing quick responsiveness to rapid load changes with corresponding changes in combustion air requirements.

The plant may be operated with a variation in air flow through the compressor set and air heater in proportion to the combustion air demands of the fuel being burned, in which case valve 115 will be closed or the lower stage exhaust line 108 to the zone Z of the gas pass omitted. On the other hand the plant may be operated with a variable speed compressor set but with a greater air flow through the air compressor set and air turbine than that introduced as combustion air to the furnace. Under the last mentioned method the valve 115 controlling the flow through the exhaust line will direct the air turbine exhaust air in excess of the combustion air requirements to zone Z.

The distinctive feature of the combined plant shown diagrammatically by Fig. 10 is thus the provision for driving the compressor set, comprising compressors 83, 92 and 120, by the non-condensing steam turbine 225 receiving steam from the heat absorbing unit through pipe lines 29 and 29' and controlled as to speed by a governor actuated valve 230 which regulates the quantity of steam introduced to the turbine through pipe 230'.

The non-condensing turbine 225 exhausts steam from its final stage through pipe 226 to a heater 54 of the feed water heating system of the main power generating steam turbine 41, flow direction control valves being introduced in one or both pipe lines 49 and 226, such as flow valve 49' in line 49. Additional exhaust or steam bleed lines 227, 228 and 229 connect additional higher pressure stages of turbine 225 to the heaters 53, 52 and 51 respectively of the feed water heating system. Flow control valves 47', 46' and 45' are shown in the steam bleed lines to these heaters from the main steam prime mover.

The speed governing of the turbine 225 is indicated in principle by an adjustable fly ball governor 231 connected to the valve stem of a regulating valve 230 through a suitable linkage. A compression spring 232 is adjustable through a worm-wheel drive 234 from a reversible governor motor 235.

The steam turbine driven compressors 83, 92 and 120 are connected to inter-coolers 70 and 71 corresponding to similar apparatus shown by Figs. 2 and 3 and having the same type of thermostatic control for using service water cooling if desired. The use of the steam turbine 225 both for starting and operating the compressor set throughout the starting and load range of both the heat absorbing unit and the power generating air turbine, obviates the necessity of a separate electric motor for compressor starting.

Compressed air from the final stage of compressor 120 is delivered through the low temperature air heater 17, the intermediate air heater 17' and the high temperature air heater 9 to conduit 100 to supply the power generating air turbine 80b'. The air turbine 80b' will be operated at constant synchronous speed and the method of operation of the apparatus described with respect to the arrangements of Figs. 2 and 3 may be carried out as previously described. As the power to drive the compressor set amounts to a major portion of the power developed by the expansion of the heated air delivered by the set, the power delivered by generator 110 driven by air turbine 80b' will be more than twice the delivery from the generator driven by air turbine 80' of Fig. 3 for the same air flow conditions, inasmuch as the compressor set power is not subtracted therefrom, since that power is supplied by the steam turbine 225.

By the use of a steam turbine drive for the compressor set, the compressor set may be operated at variable speeds in accordance with a method hereinafter described and, particularly when operating under variable speed and with variable air delivery, is quickly responsive to changing combustion air requirements as determined primarily from steam plant loading. The arrangement of Fig. 10 also provides an economic arrangement of a variable speed non-condensing steam drive for the compressor set in that the stage feed water heaters of the main unit are utilized for the exhaust of the non-condensing steam turbine, thereby avoiding duplication of such heat exchange equipment.

*Combination plant with condensing steam turbine drive for compressors*

As the amount of power used to drive the compressor set is roughly 50% greater than the useful power developed by the air turbine, the power rating of the steam turbine driving the compressor set may be such as to make it economic to use a condensing type steam turbine. Fig 11 shows an arrangement involving such a condensing steam prime mover for driving the compressor set, with the condensate from its condenser serving as inter-cooler water and subsequently being heated by turbine stage extraction heaters from which it is delivered to the boiler feed water supply line to which the feed water heater of the main power generating prime mover also discharges. The inter-cooling between the second and third stages of the compressor is acomplished by an inter-cooler served by the condensate of the power generating prime mover.

The variable speed condensing type steam turbine 270 drives the multi-stage compressor set consisting of compressors 83, 92 and 120. The compressor driving turbine operates in parallel with the main power generating turbine 41 with respect to source of steam and each has its own feed water heating system of a stage bleeding regenerative type to raise the temperature of the condensate to the optimum degree. The condensate from the main unit will be in an amount considerably in excess of that resulting from the condensing of the exhaust of the turbine 270 when the combined plant is operating at full or near full rated load, but that proportion will change as the combined plant is operated at lower fractional rated loads.

As shown by Fig. 11, the condensate from both the main steam turbine condenser 42 and the condensate from the condenser 271 serving the compressor drive turbine 270 is used for inter-stage cooling of the compressed air. With three stages of compression and two inter-coolers, one inter-cooler 70 cooling the air between compressors 83 and 92 utilizes condensate from condenser 271 delivered by pump 272, while the other cooler 71 connected between compressors 92 and 120 is served by condensate from the main steam turbine as previously described for the plants shown in Figs. 2 and 3.

Due to the disproportionate quantities of condensate from the condensers 42 and 271, even under fractional load conditions on the steam unit 41, it is desirable to provide a greater number of inter-stage coolers, or otherwise proportion the inter-cooling effects, so that the compressor inter-stage cooling is carried out in part by condensate from the main turbine and in part by condensate from the compressor driving turbine, the heat removal in each case being at least roughly proportional to the quantity of condensate from the condenser of each prime mover. In other words, the apparatus would be arranged to effect compressor inter-stage cooling by condensate from both the main turbine condenser and the compressor driving turbine condenser in proportion to the heat absorbing capacity of the respective condensate flows. By way of example, four or more compressor stages would be driven by turbine 270, with three or more inter-coolers arranged in the air flow paths between stages. At least one of the inter-coolers would be served by condensate from the condenser 271, while two or more inter-coolers would be served by condensate flowing from condenser 42.

After the condensate from condenser 271 has been heated by the inter-cooler heat, it is passed through stage feed water heaters 273, 274 and 275, served from selected inter-stage bleed connections 273', 274' and 275' respectively to several different pressure stages of turbine 270, to heat the water to a degree acceptable as feed water for the heat absorbing unit, the condensate being delivered through pipe 25' to the main feed water line 25. The combined flow of feed water passes to the economizer 8a and thence to the steam and water drum 27. Service water coolers 73 and 73' are provided in connection with inter-coolers 70 and 71 and automatic control of service water inter-cooling may be effected by thermostatically controlled valves arranged as in Fig. 2.

The system shown in Fig. 11 is adapted for the same method of operation under variable load conditions as described for Fig. 10.

The combined plants shown diagrammatically in Figs. 10 and 11 have the advantage that they can be operated with constant speed and constant delivery of air by the compressor set, with the air flow from the exhaust of the air turbine controlled in accordance with the method of operation described for the arrangement shown in Fig. 3, for the range of load down to the reduced load on the steam mover at which condensate water will adequately cool the maximum full load rate of flow of inter-stage air. At fractional loads below that point, the compressor set can be operated at variable capacity and pressure delivery, whereby the reduced condensate flow will still provide inter-cooling to a greater degree than with the operation of the plant shown in Fig. 3, and thus service water inter-cooling may be avoided or minimized. As the attainment of a minimum inter-cooler heat loss from the system through heat transfer to service water, while conditioning the air delivered from the high pressure stage of the compressor for effective recovery of low level heat from the products of combustion by the low temperature high pressure air heater, is a major controlling factor in the attainment of high plant efficiency, the last mentioned method of operation has substantial advantages.

Figure 13:
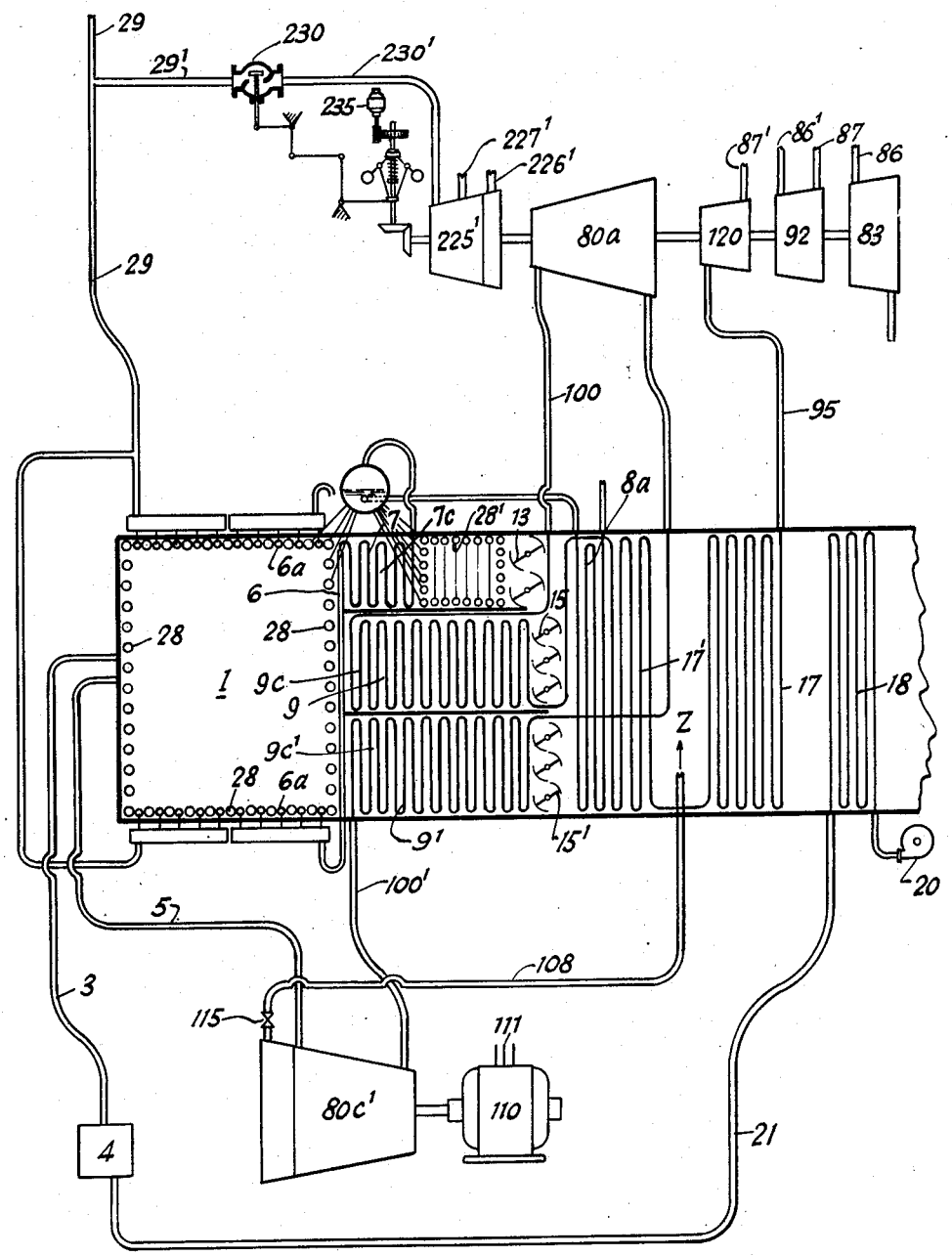
Fig. 13 illustrates a modification in which the compressor set is driven jointly by a non-condensing steam turbine and an air turbine.

*Control apparatus for plants of Figs. 10, 11 and 13*

Figure 12:
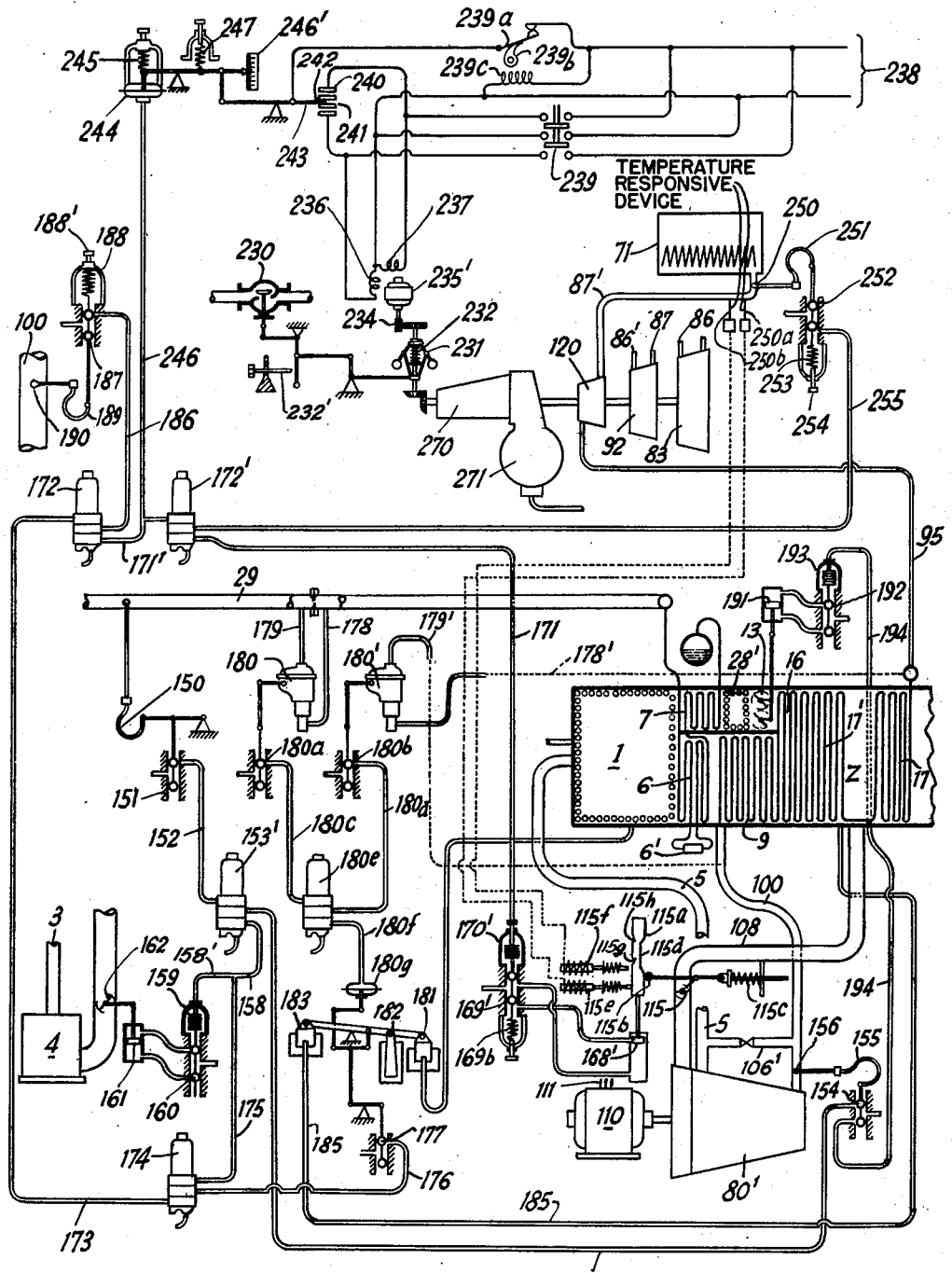
Fig. 12 illustrates in diagrammatic manner an arrangement for automatic control involving variable speed operation of the compressor set.

Fig. 12 illustrates a control system particularly adapted for regulation of the binary fluid power plants shown in Figs. 10, 11 and 13. The control apparatus is flexible and may be alternatively used for carrying out different methods of operation, such as maintaining a constant air flow through the compressor and air turbine, varying the air flow through the compressor and air turbine, or a combination of both methods wherein a constant rate of air flow is used for one range of load variation and a varying rate of air flow for another range of load.

The method of operation based on a constant air flow will be described first. With a constant air flow through the compressor and turbine at a rate corresponding to the maximum secondary air requirements of the furnace at full rated load, the turbine or prime mover driving the compressor set will be operated at constant speed. With the compressor set operating at the predetermined speed and rate of delivery, the regulation of the supply of the combustion elements and the control of heating gas flow over the heat absorbing surface will be substantially in accordance with the method and apparatus described with respect to the plant arrangement of Fig. 3 and the control system shown by Fig. 8. In this case certain of the control elements shown by Fig. 12 will not be needed and will be maintained in an adjusted condition in which they will have no effect on the controlled elements.

The adjustable speed governor of the steam turbine 270 is disclosed as the customary fly-ball type in which adjustment of the compression spring 232 by the control motor 235' is accomplished through a worm and wheel drive to the adjusting nut on the spindle. With a departure in the speed of the turbine from that corresponding to the particular adjustment of the spring 232, the fly-ball actuated collar will modify the position of the steam governor valve 230 to increase or decrease the steam flow and thereby readjust the turbine speed to the desired amount determined by the spring adjustment.

The motor 235' is of the reversing type, the double windings 236 and 237 indicating the capacity for rotation in either direction according to which winding is energized. The source of power for energizing the motor is indicated at 238, and a double throw switch 239 shown in neutral position may be manually operated to energize either winding 236 or 237 to adjust the governor independently of the automatic control.

To limit the incremental extent of governor adjustment of the steam flow valve when the speed of the turbine 270 is subject to automatic control in coordination with the combustion control portion of the apparatus, a make and break device is interposed in the power supply current related to the automatic control of the reversing governor motor. The device consists of an interrupting finger 239a carrying an electrical contact which is periodically opened and closed through the agency of a cam 239b driven by a continuously running motor 239c. This interrupting device does not interfere with the manual adjustment of the governor by means of switch 239.

Contacts 240, 241 and 242 are provided for energization of one or the other motor winding to give rotation of the motor 235' in either direction depending upon whether the contact bar 243 is raised or lowered from the neutral position shown. The contacts 240 and 241 complete the circuit to winding 237 when the bar is in the upper position, contacts 241 and 242 completing the circuit to winding 236 when the bar is in the lower position. The bar 243 is movable through the linkage about the fixed pivot by an actuating device 244, indicated as a bellows restrained by a screw adjusted compression spring 245. The adjustment of the spring is made such that the bellows is expanded or contracted to tilt bar 243 into a position to close the upper pair of contacts or the lower pair of contacts depending upon the variation in loading pressure transmitted to the bellows by conduit line 246. For example, when the steam pressure in line 29 drops Bourdon tube 150 flexes to operate pilot 151 to reduce the loading pressure in 152 and this reduction in loading pressure is transmitted through relays 153', 174 and 172, giving a lowered loading pressure in line 246 connected to the bellows 244.

The governor of the turbine 225 of Fig. 10, of turbine 270 of Fig. 11, or turbine 225' of Fig. 13 is adjusted through manual operation of switch 239 to give the speed at which the compressor set will deliver the secondary combustion air required for maximum plant load, the primary air for the pulverizer being delivered by a separately driven blower 20. With the plant operating with such an air flow and at operating temperatures, two control elements of the system shown by Fig. 12 will be adjusted to an inoperative position, i. e. the bellows 244 and pilot 252. The bellows will be made inoperative with the bar 243 in neutral position as shown by the pointer on scale 246' by an adjustment of spring 247 to exert a force on the bar which is greater than that which may be exerted by the bellows device. The temperature responsive air pilot valve 252 will also be adjusted by the nut 254 so that changes in temperature determined by the bulb 250 and Bourdon tube 251 will not effect a movement of the valve. The temperature responsive device 190 will also be made ineffective by adjustment of spring and nut 188'.

With constant air flow through the compressor, high pressure air heater and air turbine, a substantially constant delivery of power will be developed by generator 110 and variations in load on the combined plant will be taken by the steam turbo-generator set 41, 43. On a reduction of steam turbine load, the pressure in supply line 29 will tend to increase and such an increase will cause the Bourdon tube 150 to move causing the pilot valve 151 to reduce the delivery of loading air from the loading pressure source to the loading line 152 connected to relay 153'. This relay transmits the reduced loading pressure through conduit line 158 and 158' to the bellows 159 to position pilot valve 160 so that it introduces air to one side of the power piston 161, whereby the damper 162 controlling the introduction of primary air to the direct firing pulverizer 4 is positioned to decrease the flow of air and concurrently reduce the pick-up of pulverized coal in the pulverizer and its delivery to the burners through burner pipe 3.

With a reduced fuel delivery to the furnace, a corresponding reduction in the rate of introduction of secondary air must be accomplished if good combustion efficiency is to be maintained. The control of the secondary combustion air to the furnace is accomplished through an adjustment of valve 115 in the exhaust from the last stage of the air turbine communicating with the low pressure and temperature zone Z in the convection pass of the heat absorbing unit. When the combined plant is operating at full load, the valve 115 will be substantially closed with substantially all of the air passing through the turbine being delivered from the interstage outlet at a higher pressure to the furnace through conduit 5. When a reduced steam flow causes a reduction in fuel input to the furnace as above outlined, the reduced loading pressure in line 158 will cause a corresponding reduced loading pressure to be transmitted through connecting lines 175, 173, 171' and 171 and intermediary relays 174, 172 and 172' to the bellows 170' controlling the position of pilot valve 169', whereby the position of the piston 168' will be modified to cause damper valve 115 to open, or to increase its opening, permitting a regulated amount of air from the air turbine to be exhausted from the last turbine stage through conduit 108 to the zone Z in the convection heating gas pass.

In order to obtain a readjustment of air flow to obtain a proper air-fuel ratio, additional apparatus comparing the heat absorption in terms of steam flow in the line 29 and air flow through the high pressure air heater with respect to the flow of gaseous products of combustion, is provided. Mechanism 180 with pressure connections 178 and 179 to the upstream and downstream sides of a flow orifice in the steam line 29 measures the steam flow and mechanism 180' correspondingly measures the air flow through the high pressure air heater by pressure connections 178' and 179', respectively, to the air heater inlet and outlet, whereby the air pressure drop through the air heater is determined and used as a measure of flow. As the method of operation now being described involves constant air flow, mechanism 180' will not show any change. The varying steam flow indication transmitted from 180 to a pilot valve 180a will modify the loading pressure in line 180c to relay 180e and as the loading pressure in 180d is not changed, the relay 180e transmits a correspondingly modified loading pressure through line 180f to bellows 180g.

A flow mechanism consisting of the conventional elements 181, 182 and 183, as disclosed in Fig. 8, operates to measure the flow of products of combustion across the main convection heat absorbing surface, the bells 181 and 183 being connected by pressure conduits 184 and 185 to the furnace 1 and to a position in the heating gas pass ahead of zone Z where the exhaust air is introduced through conduit 108.

Through the linkage connecting the bellows 180g and the gas flow mechanism, a movement of loading valve 177 is developed in case the previously modified air flow by the initial adjustment of damper valve 115 has not given the correct ratio of gas flow to the modified heat absorption as measured by steam flow. In such a case depending on whether the gas flow is too high or too low, the valve 177 will be moved in one direction or the other to change the loading pressure in line 176. The modified loading pressure in line 176 is transmitted to relay 174 and increases or decreases the loading pressure transmitted through lines 173, 171' and 171 and intermediary relays 172 and 172' to modify the pressure in bellows 170', whereby the pilot valve 169' controlling the air to piston 168' will permit a corresponding modification of the position of the piston and thus of the exhaust air flow control valve 115, readjusting the division of exhaust air from the turbine 80' through conduits 5 and 108 to give the proportion of secondary air to the furnace with respect to the fuel introduction which has not been changed by the readjusting apparatus.

In case the modified rate of fuel burning does not provide sufficient heating gas at adequate temperature to insure the heating of the high pressure air to the predetermined outlet temperature, two further modifications are effected by the apparatus, the first affecting the rate of fuel introduction and a concurrent change of combustion air, and the second involving a change in the gas flow over the heat absorbing surfaces of the unit.

Temperature responsive element 156 is located in the outlet of the high pressure air heater 9 and through the connected Bourdon tube device 155 gives an indication by movement of pilot valve 154 of changes in air temperature. With a temperature below the predetermined value, the pilot valve 154 will be raised causing an increased loading pressure to be transmitted to line 157 and a decreased loading pressure to line 194. The increased loading pressure in line 157 will act through relay 153' to increase the loading pressure delivered through line 158, and the supplies of fuel and air to the furnace will be correspondingly increased as a reverse operation to that previously described for reduction of fuel and air introduction due to increased steam line pressure.

An offsetting adjustment is, however, made simultaneously due to the lowered loading pressure in line 194 by a change in position of dampers 13 by piston 191, the dampers being moved to reduce the gas flow over the secondary superheater 7 and the steam generating bank 23', and to correspondingly increase the flow over the superheater 6 and high pressure air heater 9. This modification in gas flow will for the same rate of fuel input as before give an increased air outlet temperature with a lowered generation of steam and a reduction in heat absorption by superheater 7.

In the arrangement of control apparatus shown in Fig. 12, the modification of gas flow and the modification of heat release in the furnace would occur simultaneously. It may be desirable however to have these changes occur sequentially, with the fuel input coming into action only after some adjustment of dampers 13 has occurred. This may be readily accomplished through the introduction of suitable control elements.

Increased demands for steam as indicated by a reduction in pressure in the steam line 29 will occasion a reverse action of the control elements as compared to that described above for decreased steam demand.

The second method of operation which may be carried out with the control apparatus illustrated in Fig. 12 involves the variation of the power production of the air turbine concurrently with variation in the load on the steam turbo-generator. A variation of air flow through the air turbine is utilized throughout the entire load range of the plant. This variation is accomplished by utilization of the apparatus to control the speed and air delivery of the compressor in accordance with combustion requirements. The manner in which the apparatus operates to carry out such a method is outlined for the low load range of the third method described hereinafter.

A third and preferred method of operation utilizes the first method for the higher range of loads, the second method for the lower range of loads, and a different method for an intermediate range of loads. It will be described hereinafter.

In so operating a plant comprising a variable speed drive compressor set, as indicated by Figs. 10, 11 or 13, utilizing the control apparatus illustrated in Fig. 12, the compressor speed will be controlled during the starting phase and through the very low fractional load range by the manual control switch 239, the automatic control of the governor adjustment being made inoperative by the adjustment of spring 247. When the fuel fired heat absorbing unit is delivering steam and preheated air, the steam prime mover may be started. The air turbine is subsequently started, the valved bypass 196', which is open during initial firing, then being closed. With an appreciable flow of condensate being delivered from the condenser, the plant will then be placed under automatic control by the release of spring 247 to permit the governor motor to be controlled by the loading pressure transmitted by conduit 246 to bellows 244.

For the lower range of fractional plant loads where the condensate flow is at a rate at which it will not inter-cool to a predetermined temperature a higher rate of air flow through the compressor than the amount needed for combustion of the fuel, the rate of air delivery, in accordance with combustion air requirements, is controlled by variation of compressor set speed through automatic regulation of governor adjustment from bellows 244. For this lower range of fractional loads, spring 169b is adjusted to position the pilot valve 169' so that piston 168' will close valve 115 and at the same time the restraining force exerted by the spring is sufficient to counterbalance the loading pressure in line 171 which is responsive to the relay 153'. At the same time the position of pilot valve 252 is so adjusted that no loading pressure will be transmitted to line 255 while the compressed air leaving the inter-cooler 71 is at or above a predetermined temperature, as for example, 105 F.

For the higher range of fractional loads up to and including the top full load on the combined plant, through which the condensate flow is sufficient to inter-cool to a substantially greater air flow from the compressor, the pilot valve 252 will be moved downward in opposition to the compression spring 253 when the temperature of the air, as determined by thermostatic device 250, falls slightly below a predetermined temperature. This movement of the pilot valve 252 introduces a loading pressure into line 255, of sufficient value when combined in relay 172' with the loading pressure responsive to relay 153', to move pilot valve 169' as restrained by spring 169b to initiate an opening action of valve 115. The mechanism 181, 182 and 183 measuring the flow of products of combustion then readjusts the air delivery from the compressor set by an increase of speed sufficient to supply the additional air flowing through valve 115, so that the furnace will still be supplied with sufficient combustion air through conduit 5.

Further progressive increases in load on the steam plant with resulting increase in condensate flow will progressively increase the opening of valve 115 until at some fractional load, as for example load X indicated in Fig. 4, the valve 115 will be at its maximum opening adjusted to permit a flow through conduits 5 and 108 substantially equivalent to the secondary combustion air requirements of the furnace when the plant is at top full load. The compressor set will then have been speeded up to maximum speed by the governor control mechanism. An adjustable stop 232' in operative relation to the governor limits the operating speed of the turbine 270 to or substantially to the optimum speed of the compressor set for good efficiency.

When the load on the steam plant is progressively increased above load X, with corresponding increases in fuel introduction, the furnace will require more combustion air, and as further increases in compressor speed are prevented by the governor stop, the increase in supply of combustion air to the furnace is accomplished by progressively restricting the opening of valve 115 as the load increases until the valve will be closed or substantially closed at top load, with or substantially all of the air delivered by the compressor flowing to the furnace through the air turbine exhaust conduit 5. The movement of the piston 168' with a cam and follower drive to the shaft of the valve 115 permits the progressive opening of the valve on a portion of the stroke and progressive closing of the valve on the remainder of the stroke, thus permitting progressive opening of the valve upon increases of load below and approaching load X and progressive closing of the valve on increases of load from load X to top load. The shape of the cam 115d is such as to give the proper relation of movement of the piston to the flow area through the valve. It is also so shaped that the reversal of valve movement is somewhat delayed. In order to insure that reversal of movement is not made before conditions are substantially stable, an inter-lock 115e is arranged so that on increasing loads the valve will not be reversed until the temperature of the inter-cooler discharge is at or below a predetermined degree. Inter-lock 115f is arranged for decreasing loads and is arranged to delay the reversal of the damper until the temperature of the inter-cooler discharge is at or above a predetermined temperature.

When with increasing steam load the valve 115 has reached a wide open position with the cam follower 115b in the center of the cam, and the cam tending to move downwardly due to the demand for more combustion air to the furnace, the spring projected pin of the inter-lock 115e will advance into the lower notch 115g of the cam in case the temperature of the inter-cooler discharge has not been reduced to or below a predetermined temperature, as for example 105 F., during the period of time the follower is contacting with the flat face of the cam in approaching the center. When the temperature of the inter-cooler discharge, as determined by a temperature responsive device 250a is at 103 F., the solenoid associated with the inter-lock pin will be retracted from the lower notch 115g against the advancing force of the spring, thus permitting the piston 168' to continue to advance the cam in the same direction. With further advance of the cam, the valve will start a closing movement and will be closed or substantially closed at the full down position of piston 168'. In this position the plant will be operating at top load with all or substantially all of the exhaust from the air turbine directed through conduit 5 due to the restriction of valve 115.

With a reduction of load from maximum, the load on the main steam turbine will be reduced and the reduced steam demand will cause the control apparatus to reduce the fuel and also reduce the combustion air input to the furnace by diverting a portion of the air turbine exhaust into conduit 168. This is accomplished by the reduced loading pressure to bellows 170' and a resultant upward movement of the piston driven cam. Progressive reduction in steam load and fuel input to the furnace will return the valve 115 to a wide open position, at which the full speed delivery of air from the compressor is divided at the air turbine exhaust, the major portion going to the furnace and a minor portion into conduit 168. At this load, which will be load X, the inter-cooler air discharge temperature will have returned to approximately 105 F. due to the reduced condensate flow and when such a temperature condition is reached, the inter-lock 115f, which is subject to the temperature responsive device 250b, will be adjusted by the flow of current to its solenoid to retract the holding pin from the upper notch 115h of the cam.

The cam can then be raised further in accordance with the combustion air requirements to modify the position of valve 115 and reduce the flow of air to conduit 168. This will direct more air into the furnace when less is needed for fuel combustion and the correction is concurrently accomplished by a reduction in speed of the compressor set due to the action on bellows 244. Because of the reduced flow of air and a lower compression ratio in the compressor set, the condensate flow is better able to maintain the predetermined maximum inter-cooler discharge temperature of 105 F. Further reductions in steam load will cause corresponding changes in air delivery from the compressor.

Even though the delivery and compression ratio is reduced, there comes a time when the condensate flow is inadequate to accomplish the predetermined inter-cooler air discharge temperature and when the temperature rises over that temperature, as for example 105 F. the modification of the position of pilot valve 252 will reduce the loading pressure to line 255. This will in turn lower the pressure to bellows 170' so that at a reduced fractional load the loading pressure in the bellows will be overcome by the compression spring 169b, whereby the pilot valve 169' will be positioned to effect a closing of valve 115. Further reductions in steam plant load will be accomplished with a reduction in speed and delivery of air by the compressor in direct proportion to combustion air requirements.

The third method of operation which has advantages from the thermal efficiency standpoint involves operation with full load rate of secondary combustion air through the compressor set, air heater and air turbine for a range of plant load down to a predetermined fractional load, through which fractional load range the reduction in plant load is taken by the steam turbo-generator and through which the condensate will provide adequate interstage cooling for the air being compressed, and for still lower fractional loads a progressive reduction in air flow through the compressor, air heater and air turbine will be made as the load on the plant is reduced.

The use of some service water inter-cooling in combination with condensate inter-cooling, the former being under either manual or automatic control, will extend the load range through which the plant may be automatically controlled with variation of the air delivery to the furnace being accomplished as above described by regulation of the compressor set speed.

If it is desirable to effect control of the variation in air flow from an initial impulse other than the air temperature leaving inter-cooler 71, to supplement or modify the variation of air flow by some other variable factor, as for example, from variations in air heater outlet temperature, in superheated steam temperature, in furnace temperature, in some rate of fluid flow or in any other measurable variable, modification can readily be accomplished by a controlled variable load pressure introduced to relay 172 through conduit line 186. In the system illustrated, a modification in compressor set speed can be effected by variation in heated air conduit 100 through the temperature responsive bulb 190 connected to Bourdon tube 189. The temperature at which the Bourdon tube will effect movement of the air pilot valve 187 is adjustable through spring 188, and adjusting nut 188'. When such a modifying control is not desired, pilot valve 187 can be made inoperative by adjustment of the spring.

Device 189', as used in the arrangement of Fig. 12, contemplates operation with substantially constant density air through the high pressure air heater, such as will occur when the rate of delivery of air from the air heater is constant. Provision for compensating for a variation in air density, which may occur to some extent with variable speed compressor operation, can be made by the introduction of the usual corrective devices.

The control apparatus of Fig. 12 thus provides for wide load range regulation of the combustion air supply means with respect to the ability of the condensate from the condensing steam turbine to furnish inter-stage cooling of the air to a predetermined degree. For this purpose, the controls modify the speed of the air supply means throughout a predetermined fractional load range up to a fractional load at which the condensate flow is adequate to cool the maximum load secondary combustion air requirements, the modification being determined by variations in the demand of heating gases for steam generating and superheating and air heating.

In the lower portion of the variable speed load range, the speed of the air supply means is regulated in accordance with an indication of changing heat demand such as is evidenced by a variation in steam line pressure and/or air heater outlet temperature from a predetermined value, and all of the air from the air supply means passes through the air turbine to the furnace. Through this portion of the load range the controls automatically confine the exhaust air delivery from the air turbine to the furnace in accordance with variations in temperature above a selected degree in the inter-cooler air outlet, thus preventing any exhaust air flow from the air turbine to the rearward portion of the heating unit gas pass.

Throughout the higher portion of the variable speed load range where a greater condensate flow is available for inter-cooling, providing a delivery of air from an inter-cooler below a predetermined temperature, a temperature responsive device in the air stream from an inter-cooler acts to permit and regulate an exhaust air flow from the air turbine to the rearward portion of the heating gas pass. The steam pressure and/or air temperature responsive devices act through their related control apparatus to adjust the fuel and combustion air inputs to the furnace, the variation in air delivery from the air supply stream being accomplished by adjustment of the speed of the air supply means through the governor adjusting device. Readjustment of the fuel-combustion air ratio to the predetermined standard is subsequently accomplished with the steam flow and air flow versus gas flow ratio device.

The upper limit of the variable speed range of the air supply means thus corresponds to the speed and delivery of the air supply means at which the delivery of compressed air is cooled by an inter-cooler to a predetermined temperatue by the flow of condensate from the steam turbine. The fractional load range above this upper limit constitutes a load range in which the air supply means will be operated at constant speed and delivery.

For the constant speed range the stop associated with the governor mechanism prevents any further increase in speed of the air supply means and regulation of the introduction of combustion air to the furnace is accomplished by a control of the division of the air turbine exhaust air into a furnace stream and into a stream directed into the rearward portion of the heating gas pass. As in the other load ranges the indications of heat demand, as measured by variations in steam pressure and/or air temperature, regulate the fuel input into the furnace, and these same indications in combination with an indication of the temperature responsive device associated with the air outlet of an inter-cooler which becomes effective at the lower air temperatures resulting from the higher condensate flow, further adjusts the control valve controlling the distribution of the air turbine exhaust air between the furnace and the gas pass to progressively close the valve with increases in load. As in the operation of the controls for the other load ranges, a readjustment of the fuel-furnace air ratio to a predetermined standard value is subsequently accomplished with the airflow-gas flow ratio device.

The fuel-combustion air ratio, which is a measure of excess air over the theoretical combustion air requirements of the fuel, is subject to automatic regulation in accordance with indications of a variable condition in the plant, as for example the temperature of the high temperature air leaving the air heater. An indication of temperature, as from thermo-responsive device 190, when in excess of a predetermined degree will decrease the motivating impulses controlling the furnace air input without correspondingly modifying the fuel input. This control when made operative by adjustment of spring 187 will function in any of the three described load ranges.

*Binary fluid power plant with variable speed air turbine and steam turbine driven compressor*

Fig. 13 shows a modified arrangement of the fuel fired heat absorbing unit and the aerodynamic turbine section which may be substituted for the corresponding equipment in the power plant arrangement shown in Fig. 10.

The multiple stage compressor made up of stages 83, 92 and 120 is in this instance driven primarily by a high pressure air turbine 80a in tandem drive arrangement with an auxiliary non-condensing steam turbine 225'. The air turbine receives air from the outlet of a high pressure high temperature air heater 9, expands the air through a portion of the pressure range down to atmospheric pressure, and thereby develops power for driving the multiple stage compressor. The high pressure turbine exhausts to an inter-stage intermediate pressure high temperature air heater 9' and the air is heated therein to the optimum temperature for effective expansion in the low pressure power generating air turbine 80c' which exhausts to the furnace and/or the rearward low gas pressure zone Z. Compressor inter-coolers of the type shown in Fig. 10 are used in this arrangement also.

In the arrangement shown, the steam turbine 225' need be only of a capacity sufficient to give starting power for the compressor and high pressure air turbine until high pressure high temperature air is available to drive the high pressure turbine and of sufficient capacity to provide the desired speed regulation of the high pressure air turbine-compressor set to which it is directly connected. In other words the air turbine 80a in the Fig. 13 plant system will be so designed that at any speed of rotation and corresponding delivery of air under pressure, the power developed by the expansion of that air after heating to the optimum temperature in the high pressure air heater 9 will not be sufficient to maintain the speed. This deficiency in power is provided for by the direct connected high pressure non-condensing turbine 225', which has available the storage of energy in the connected steam drum, and regulation of this prime mover is used to provide variable speed operation of the high pressure air turbine-compressor set.

Inasmuch as the capacity of the steam turbine 225' will be but a fraction of the capacity of the high pressure air turbine 80a, its size will be economically small and the amount of steam which it will use and deliver as exhaust to the feed water heating system of the power generating steam turbine 41 will be in an amount which can be conveniently handled. The steam generating and superheating section of the heat absorbing unit need not be greatly increased in size as compared to the unit shown in Figs. 2 or 3, where a single air turbine drives both the compressor set and a power generator.

As the inter-stage intermediate pressure air heater 9' is desirably operable to deliver air at a temperature as high as the delivery from the high pressure heater 9, it is advantageous to arrange its heat absorbing surfaces in commensurate gas streams. In the arrangement shown in Fig. 13, the gas flowing from the furnace may divide into three parallel gas passes 7c, 9c, 9c', controlled by dampers 13, 15 and 15' respectively. The high pressure air heater 9 is arranged in pass 9c and is positioned close to the furnace, being shielded therefrom as regards radiant heat by a tube screen which in the present instance is made up of a combination of steam generating tubes 28 and superheater tubes 6, although either type of cooling tube might be used alone. The inter-stage intermediate pressure air heater 9' is located in the adjacent gas pass 9c' where it is subject to the same heating gas temperatures. The third gas pass 7c controlled by dampers 13 is provided for a convection superheater section 7 from which the outlet tubes 6 extend across the entrances to the passes 9c and 9c' to direct steam to radiant superheater tubes 6a arranged in the opposite walls of the furnace, the superheater tubes being mounted between steam generating tubes 28. By this arrangement of heat absorbing surface, a better balance between the steam generating and superheating surface and the air heating surface can be attained in securing the desired degree of steam superheating and high temperature air heating with the gas temperatures available.

As previously mentioned, the combined plant illustrated in Fig. 13 can be operated in accordance with the control methods described with reference to the combined plants of Figs. 10 and 11. With a division of the heating gas flow from the furnace into three streams, the distribution through the three passes can be controlled by manual operation to the end that the heating of the air in each of the pressure air heaters 9 and 9' will be to the correct degree and in proper relation to the outlet air temperature from the other, as well as in relation to the rate of steam generation and superheating effected by the gas flow through pass 7c as controlled by dampers 13. The control devices and principles of application described in connection with the control apparatus shown by Fig. 12 are adaptable to such automatic control. The speed regulating steam turbine 225' with its shaft connection to the shaft of the compressor drive air turbine 80a, as shown by Fig. 13, is similarly applicable to the shaft drives of the compressors of the other arrangements, wherein the primary power is obtained from an air turbine, as for example in Figs. 1, 2, 3 and 9.

The compressor drive arrangement of Fig. 13 is highly advantageous in that it utilizes the highly efficient high pressure air turbine for the major portion of the power necessary to drive the compressor through a range of delivery speeds and volumes, while giving a readily controllable supplemental governing power increment from the steam turbine which is effectively coordinated in the plant cycle.

*Combination steam turbine and gas turbine plant*

Figure 14:
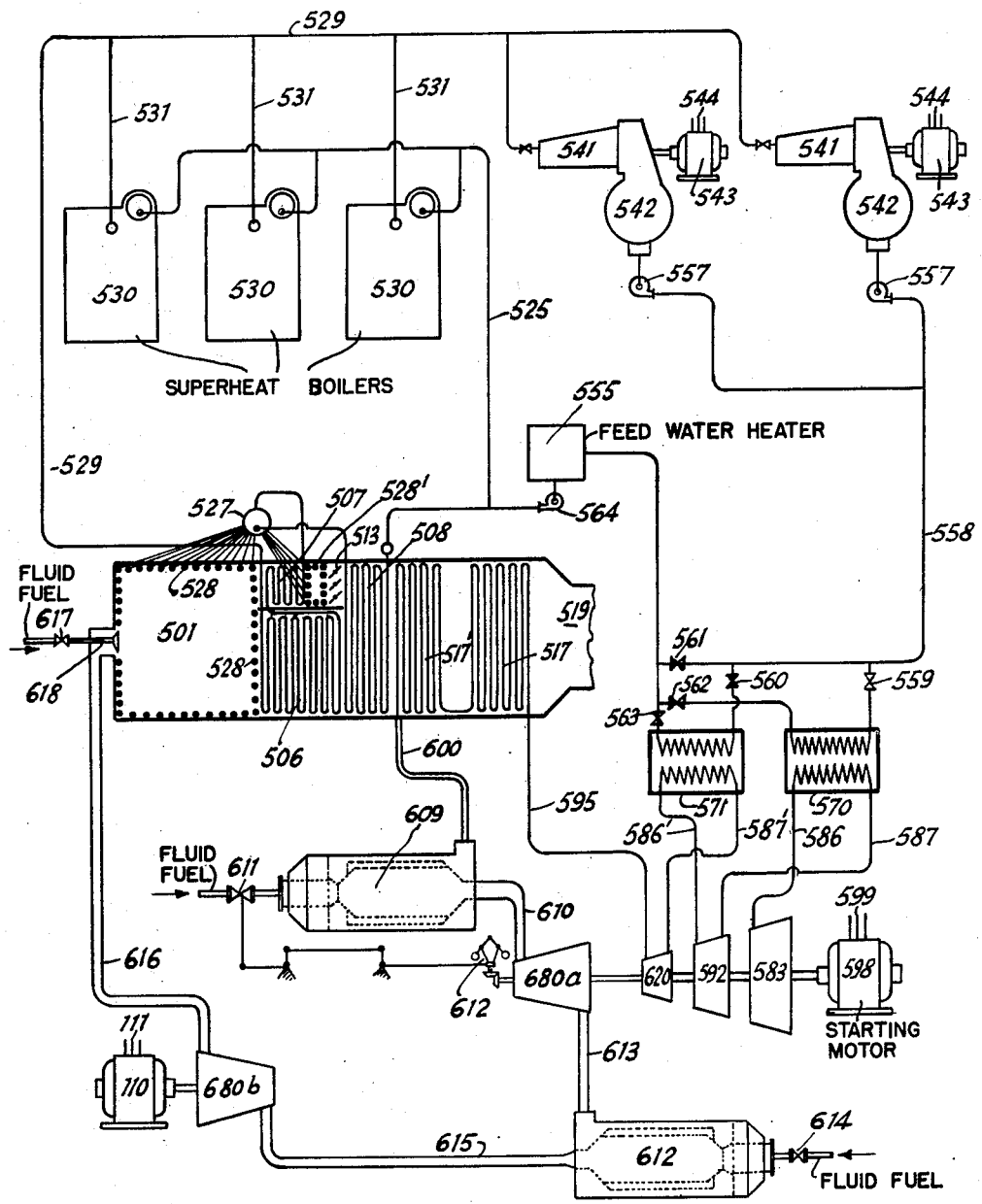
Fig. 14 illustrates in a diagrammatic manner the adaptation of the invention to a combination of a condensing steam power plant and a fuel fired gas turbine plant.

Fig. 14 illustrates diagrammatically the application of principles of my invention in a different embodiment, in which a gas turbine type of prime mover is advantageously combined with a condensing steam power section of the customary type to secure an improved overall operating thermal efficiency. In this instance condensate of the steam section is utilized for interstage cooling of a multiple stage compressor supplying combustion air and heat carrying air for a fuel fired combustion chamber serving a gas turbine. The exhaust gases from the gas turbine are utilized in a furnace of a heat absorbing unit generating and/or superheating steam for utilization by the steam prime movers.

Referring to Fig. 14, three steam generating and superheating boilers 530 are indicated as delivering steam through connections 531 to a main steam line 529 serving two steam turbines 541, each connected to its electric generator 543, which are connected to a common power user through connections 544. The turbines are of the condensing type, each being served by a condenser 542 from which individual condensate pumps 557 withdraw condensate and discharge it to a feed water heater 555. A boiler feed pump 564 withdraws water from heater 555 and delivers it to the feed-water supply line 525 which serves the several individual boilers.

The gas turbine section of the combined plant which is interconnected with the steam generating and consuming portion through condensate cooled compressor interstage coolers and through the utilization of gas turbine exhaust heat in the generation and superheating of steam utilized in the steam section, is indicated in the lower portion of the diagram. A motor 598 receiving power through connections 599 is directly connected to a multiple stage air compressor set consisting of compressors 593, 592 and 620, the motor being utilized in starting the gas turbine section. The compressor set during normal operation is driven by gas turbine 680a, and the compressor 593 delivers compressed air to inter-cooler 570 through conduit 586. When the combined plant is operated, the valve 559 is opened along with valve 562, while valve 561 is closed to direct condensate through the inter-cooler and extract heat of compression from the air introduced through 596 and returned to the inlet of the next higher pressure compressor 592 by conduit 587. The valves 560 and 563 are also opened to direct condensate through the inter-cooler 571 interposed between the discharge of compressor 592 and the inlet of the high pressure compressure 620 by conduits 586' and 587', Due to the interstage cooling, the compressed air delivered from compressor 620 to the air heating surface 517 of the heat absorbing unit is at a temperature sufficiently below the temperature of the gases flowing over the air heater surface to efficiently attain the desired temperature reduction of the latter for discharge through stack connection 519.

The air under pressure is passed through air heaters 517 and 517' of the heat absorbing unit and the heated air is directed by conduit 608 into a separate combustion chamber 609. A fluid fuel is introduced into the air and burned to generate heat and deliver a mixture of air and products of combustion at temperatures of the order of 1200 F. to 1600 F. and at a super-atmospheric pressure for utilization in a gas turbine.

The combustion chamber 609 illustrated is of the type disclosed and claimed by a co-pending application of E. G. Bailey, Ser. No. 592,257, which has issued as U. S. Patent No. 2,458,497, wherein air under a super-atmospheric pressure is heated to high temperatures by burning fuel in the air stream. A control valve 611 regulates the introduction of a liquid fuel and the heated air and products of combustion are discharged axially from the end opposite the burner to conduit 610, which directs the heated gases under pressure to the inlet of a high pressure gas turbine 680a which is directly connected to and normally drives the compressor set. The gas turbine 680a expands the heated gases from the inlet pressure and temperature to a lower super-atmospheric pressure and temperature, at which it is exhausted into the inlet of a second combustion chamber 609 of a type similar to combustion chamber 609. In this expansion the gas turbine develops the power to drive the compressor set.

The gaseous mixture introduced into combustion chamber 612 includes a considerable amount of air, and a portion of this excess air is utilized in the combustion of a regulated input of a fluid fuel controlled by a valve 614 to give a predetermined temperature of the mixture of air and products of combustion delivered through discharge pipe 615 to the inlet of a low pressure gas turbine 680b. Turbine 680b expands the heated pressure air to a pressure at or slightly above atmospheric with a reduction in temperature to produce power which is used to drive generator 110 which delivers useful power through connections 111 to the plant bus bars. As the expansion ratio for a given rate of gas flow is substantially constant, the power delivery from turbine 680b is regulable by control of the turbine inlet gas temperature through control valve 614, which controls fuel input and thus the rate of heating in combustion chamber 612.

The exhaust gases from turbine 680b at a temperature substantially higher than atmospheric and with an oxygen content sufficient to support combustion of fuel, are directed through conduit 616 to furnace 501, with or without the addition of other heat by the introduction and burning of fuel through control valve 617 and a liquid fuel burner or burners 618.

With the addition of heat by burning fuel, a temperature will be developed in furnace 501 sufficient to generate and superheat steam or superheat steam generated in other boilers. In the form of heat absorbing unit indicated, steam generating tubes 528 line the furnace walls and extend across the gas outlet from the furnace to the convection heat absorbing surfaces. Tubes 528 and steam generating tube bank 528' are connected into circulation with a steam and water drum 527 from which a secondary superheater 507 and a serially connected primary superheater 506 receive their steam. The tubes 528 and 528' are connected to the steam and water drum 527 in a manner corresponding to the connections of tubes 428 and 428' to drum 427 of the boiler shown in Figs. 5, 6 and 7. Feed water from the plant feed water line 525 is introduced to a counterflow tubular economizer 508 delivering to the steam and water drum. The steam flowing through superheaters 507 and 506 is delivered at the desired temperature to the steam line 529, to which the superheaters of boilers 530 are connected and the superheated steam passes to the steam users consisting of turbines 541.

In the apparatus shown the secondary superheater 507 and the steam generating bank 528' are positioned in a gas pass separate from the pass containing the primary superheater 506, and the gas flow through the first mentioned pass is controllable by adjustment of dampers 513. The degree of superheat may be controlled by regulation of a number of factors as previously outlined in connection with the other combined plants, as for example, by the control of furnace temperature through variation in rate of fuel input, or by modification of the ratio of gas flow through the damper controlled pass as compared with the gas flow through the pass containing the primary superheater 506. As the application of suitable control devices to automatically regulate such variables has been previously described, the application of specific control devices to the combined plant of Fig. 14 will not be detailed.

The gas turbine section may be operated either with a constant rate of air flow through the compressor set and a gas flow through the gas turbines which will be approximately constant except for variations in the amount of fuel introduced to the combustion chambers 609 and 612 or as a second method of operation, the rate of air flow from the compressor set may be varied. The condensate flow available for inter-stage cooling of air will be a factor limiting the rate of air flow if service water intercooling is to be avoided. When a variable rate of air flow is desirable, the speed of the gas turbine 680a is regulated by modification of the temperature at which the heated gases are introduced therein. To accomplish this regulation the fuel regulating valve 611 is adjustable through the linkage shown from a governor 612, so that any departure of speed of turbine 680a from the value for which the governor is set will cause a change in fuel input. The primary impulse to effect an adjustment in the speed of the compressor drive will be by the use of a temperature responsive device in the air outlet of the compressor inter-cooler, similar to element 250 of Fig. 12.

The power plant shown diagrammatically by Fig. 14 illustrates an arrangement of apparatus whereby a gas turbine section with high efficiency due to condensate recovery of intercooler heat may be combined with a lower efficiency condensing steam section to effect an improvement in overall plant thermal efficiency.

While in accordance with the provisions of the statutes I have illustrated and described herein the best forms of the invention now known to me, those skilled in the art will understand that changes may be made in the form of the apparatus and methods of operation disclosed without departing from the spirit of the invention covered by my claims, and that certain features of

I claim:

1. In a binary fluid power plant, a superheated steam generator, a fuel fired furnace arranged to supply heating gases to said steam generator, a steam condenser, a steam prime mover connected to receive steam from said steam generator and to exhaust steam to said condenser, a power driven multiple stage gaseous fluid compressor having an inter-stage condensate cooled gaseous fluid cooler and an inter-stage cooling water gaseous fluid cooler, pumping and conduit means constructed and arranged to receive condensate from said condenser and to conduct condensate through said first mentioned cooler to said generator as heated feedwater, means for passing cooling water through said cooling water gaseous fluid cooler, a heater for the gaseous fluid, a conduit connection from the high pressure stage of said compressor to said heater, a gaseous fluid prime mover, a conduit connection from said heater to said gaseous fluid prime mover, and a conduit connection from the exhaust gas outlet of said gaseous fluid prime mover to said furnace.

2. In a binary fluid power plant, a heat absorbing unit comprising a superheated steam generator, a high temperature pressure air heater and fuel fired means supplying heating gases to said generator and said air heater, a steam condenser, a steam prime mover connected to receive steam from the generator and to exhaust to said condenser, a power driven multiple stage air compressor having an inter-stage condensate cooled air cooler and an inter-stage cooling water air cooler, pumping and conduit means constructed and arranged to receive condensate from the condenser and to conduct condensate to said condensate cooled air cooler and from said air cooler to said generator as heated feed water, a source of cooling water under pressure, a valved supply connection from said source to and a discharge connection from said cooling water air cooler, a conduit connection from the air discharge of the high pressure stage of said compressor to the air inlet of said air heater, an aerodynamic prime mover, a conduit connection from the high temperature air outlet of said air heater to said aerodynamic prime mover, a conduit connection from the exhaust air outlet of said aerodynamic prime mover to said fuel fired means, and temperature responsive means operable to open said valved supply connection when the temperature of the air leaving said condensate cooled air cooler exceeds a predetermined degree.

3. In a binary fluid power plant, a heat absorbing unit comprising a superheated steam generator, a high temperature pressure air heater and fuel fired means supplying heating gases to said generator and said air heater, a power driven multiple stage air compressor, an air flow connection from the air discharge of a low pressure compressor stage to the inlet of a high pressure stage, an air discharge conduit connection from said high pressure stage of said compressor to the air inlet of said air heater, an aerodynamic prime mover, a conduit connection from the air outlet of said air heater to said aerodynamic prime mover, a flow control valve in said last mentioned connection, an exhaust air conduit connection from the exhaust air outlet of said aerodynamic turbine to said fuel fired means, a valved bypass conduit connection from the outlet of said air heater to said exhaust air connection, and a valved bypass conduit connection from said air flow connection from the air discharge of said low pressure compressor stage to said air discharge conduit connection from said high pressure stage of said compressor, whereby combustion air for the fuel fired means may be supplied by the compressor without passing through said aerodynamic prime mover.

4. In a binary fluid power plant comprising means forming a liquid-vapor cycle and means forming a gaseous fluid cycle including a multiple stage air compressor having an interstage liquid cooled air cooler, means arranged to conduct liquid flowing in said liquid-vapor cycle to and from said air cooler to absorb heat from air flowing in the gaseous fluid cycle, said gaseous fluid cycle including a multiple pressure stage gaseous fluid prime mover having a plurality of exhaust air outlets from different pressure stages, fuel fired means arranged to supply heat to said liquid-vapor cycle and to said gaseous fluid cycle, a conduit connection from one of said exhaust air outlets to said fuel fired means, and a second conduit connection from a second of said exhaust air outlets arranged to supply air at a lower temperature and pressure to heating gases from said fuel fired means.

5. In a binary fluid power plant, a fuel fired high pressure steam generator including a furnace having fuel burning means, steam generating tubes arranged to receive heat from said furnace, and a gas pass for high temperature products of combustion leading from said furnace, a convection steam superheater receiving steam from said generating tubes and located in said gas pass, a low temperature pressure air heater in said gas pass at a position rearward of said superheater with respect to gas flow and forming the main low temperature level heat absorbing surface of said steam generator, a high temperature pressure gaseous fluid heater connected to the outlet of said low temperature air heater and arranged to receive heating gases from the furnace delivering products of combustion to said superheater, a power driven super-atmospheric pressure multi-stage air compressor connected to discharge into said low temperature air heater, an interstage air cooler associated with said compressor, a high pressure steam prime mover arranged to receive superheated steam from said steam superheater, a steam condenser receiving exhaust vapor from said steam prime mover, pumping and conduit means constructed and arranged to pass condensate from said condenser through said air cooler to said steam generator as feed water, a gas turbine receiving a high temperature super-atmospheric pressure gaseous medium from said high temperature gaseous fluid heater for expansion in the generation of power, and a conduit connection arranged to deliver expanded gases from said gas turbine to said fuel burning means.

6. In a binary fluid power plant, a heat absorbing unit comprising a steam generator, a high temperature pressure air heater, a low temperature pressure air heater having a discharge connection to said high temperature air heater, and fuel fired means arranged to supply heating gases to said steam generator and said air heaters, a power driven air compressor, an air discharge conduit connection from said compressor to said low temperature air heater, a multiple pressure stage aerodynamic prime mover, a discharge conduit connection from said high temperature air heater to said aerodynamic prime mover, an exhaust air connection from an intermediate pressure stage of said prime mover to said fuel fired means, a heating gas flow pass containing said air heaters in spaced position relative to gas flow, and an exhaust air connection from the final stage of said prime mover to said gas pass at a position rearward of a major portion of the heating surface of said high temperature air heater.

7. In a binary fluid power plant, a heat absorbing unit comprising a steam generator, a high temperature pressure air heater, and fuel fired means supplying heating gases to said generator and said air heater, a power driven air compressor, a conduit connection from the air discharge of said air compressor to the air inlet of said air heater, a heating gas pass containing said air heater and a steam superheater in spaced positions relative to heating gas flow, an aerodynamic prime mover, a conduit connection from the air outlet of said air heater to said prime mover, an exhaust air connection from said prime mover to said fuel fired means, an exhaust air connection from said prime mover to said heating gas pass at a position rearward of said superheater and forward of at least a portion of said air heater; and means for controlling the distribution of exhaust air between said exhaust air connections.

8. In a binary fluid power plant, a heat absorbing unit comprising a superheated steam generator, a pressure air heater, and fuel firing means arranged to supply heating gases to said generator and said air heater, a steam prime mover arranged to receive steam from said generator, a source of feed water for said generator, a steam heated feed water heater, pumping and conduit means constructed and arranged to receive feed water from said source and to conduct feed water through said feed water heater to said generator, a steam turbine constructed and arranged to receive steam from said generator and to exhaust steam to said feed water heater, a gaseous fluid prime mover, a conduit connection from the heated air outlet of said air heater to said gaseous fluid prime mover, an exhaust gas connection from said gaseous fluid prime mover to said fuel fired means, and means for supplying the combustion air requirements of said fuel fired means comprising an air compressor driven by said steam turbine and constructed and arranged to receive air at atmospheric pressure and to deliver air at a substantial super-atmospheric pressure to the air inlet of said air heater.

9. In a binary fluid power plant, a heat absorbing unit comprising a superheated steam generator, a high pressure air heater, and fuel fired means arranged to supply heating gases to said generator and said air heater, a steam condenser, a steam prime mover connected to receive steam from said generator and to exhaust to said condenser, a second steam condenser, a second steam prime mover connected to receive steam from said generator and to exhaust to said second condenser, pumping and conduit means constructed and arranged to receive condensate from said first mentioned condenser and to conduct the condensate to said steam generator as feed water, pumping and conduit means constructed and arranged to receive condensate from said second condenser and to conduct condensate to said steam generator as feed water, a gaseous fluid prime mover connected to receive heated air from said air heater and to exhaust to said fuel fired means, and an air compressor driven by said second steam prime mover and constructed and arranged to receive air at low pressure and to deliver air at a substantial superatmospheric pressure to the air inlet of said air heater.

10. In a binary fluid power plant, a heat absorbing unit comprising a steam generator, a high pressure air heater, and fuel fired means arranged to supply heating gases to said generator and said air heater, a steam condenser, a steam prime mover connected to receive steam from said generator and to exhaust to said condenser, a second steam condenser, a second steam prime mover connected to receive steam from said generator and to exhaust to said second condenser, a condensate air cooler, pumping and conduit means constructed and arranged to receive condensate from said first mentioned condenser and to conduct the condensate to said air cooler and from said air cooler to said steam generator as feed water, a second condensate cooled air cooler, pumping and conduit means constructed and arranged to receive condensate from said second condenser and to conduct condensate to said air cooler and from said air cooler to said steam generator as feed water, a gaseous fluid prime mover connected to receive heated air from said air heater and to exhaust to said fuel fired means, a multiple pressure stage air compressor connected to said second steam prime mover and constructed and arranged to receive air at a low pressure compressor stage inlet and to deliver air at superatmospheric pressure from the air discharge of said stage to the air inlet of said air cooler, a conduit connection from the air outlet of said second air cooler to the air inlet of a higher pressure compressor stage, an air flow conduit connection from the outlet of said higher pressure stage to the air inlet of said first mentioned condensate air cooler, and an air flow conduit connection from the outlet of said first air cooler to the inlet of said air heater.

11. In a binary fluid power plant, a heat absorbing unit comprising a superheated steam generator, a high pressure air heater, and fuel fired means arranged to supply heating gases to said generator and said air heater, a steam condenser, a steam prime mover connected to receive steam from said generator and to exhaust to said condenser, a second steam condenser, a second steam prime mover connected to receive steam from said generator and to exhaust to said second condenser, pumping and conduit means constructed and arranged to receive condensate from said second condenser and to deliver condensate into the condensate stream from said first mentioned condenser, a plurality of condensate air coolers, pumping and conduit means constructed and arranged to receive condensate from said first mentioned condenser and to conduct the condensate to one of said air coolers and from said air cooler to said steam generator as feed water, a gaseous fluid prime mover connected to receive heated air from said air heater and to exhaust to said fuel fired means, and a multiple pressure stage air compressor connected to said second steam prime mover and constructed and arranged to receive air at a low pressure compressor stage inlet and to deliver air at superatmospheric pressure to the air inlet of one of said condensate air coolers, an intermediate pressure compressor stage connected to receive cooled air from one of said air coolers and to discharge pressure air to the inlet of a second of said condensate air coolers, and an air flow connection including a high pressure compressor stage from the outlet of said last mentioned air cooler to the inlet of said air heater.

12. In a binary fluid power plant, a heat absorbing unit comprising a superheated steam generator, a pressure air heater and fuel fired means arranged to supply heating gases to said generator and said air heater, a stem condenser, a multiple pressure stage steam prime mover connected to receive steam from said generator and to exhaust to said condenser, a feed water heater, a steam connection from an intermediate pressure stage of said prime mover to said feed water heater, a multiple pressure stage air compressor having one or more interstage condensate cooled air coolers, pumping and conduit means constructed and arranged to receive condensate from said condenser and to conduct condensate through said cooler or coolers to said feed water heater, a feed water connection from said heater to said generator, driving means for said air compressor comprising a steam turbine and a gaseous fluid prime mover, said steam turbine being constructed and arranged to receive steam from said generator and to exhaust steam to said feed water heater, a second gaseous fluid prime mover, said first mentioned gaseous fluid prime mover being constructed and arranged to receive heated air from said air heater and to exhaust to the inlet of said second gaseous fluid prime mover, and a conduit connection from the exhaust gas outlet of said second prime mover to said fuel fired means, whereby the gaseous fluid exhaust is utilized by said fuel fired means in the combustion of the fuel.

13. The method of wide range operation of a binary fluid power plant comprising a multiple stage air compressor, an expansion aerodynamic turbine, a condensing steam turbine, a steam generator, an air heater, and a fuel fired furnace serving the vapor generated and the air heater, which includes for maximum load operation the steps of compressing air in said compressor to a superatmospheric pressure at a predetermined rate, inter-stage cooling the air being compressed by condensate of vapor from said steam turbine, delivering the heated condensate to said steam generator, heating the compressed air to a predetermined high temperature, expanding the heated air through said aerodynamic turbine, and delivering substantially all of the expanded air to said furnace for use as combustion air; and for lower load operation the steps of compressing air at the maximum load rate while subjecting the air to inter-stage cooling by said vapor condensate, heating the compressed air to a predetermined high temperature, expanding the heated air through said aerodynamic turbine, delivering a portion of the expanded air to said furnace for use as combustion air, and delivering the remaining expanded air into mixing relationship with the products of combustion from said furnace and so as to flow over only a portion of said air heater.

14. The method of wide range operation of a binary fluid power plant comprising a variable speed multiple stage air compressor, an expansion aerodynamic turbine, a condensing steam turbine, a steam generator, an air heater, and a fuel fired furnace serving the vapor generator and the air heater, which includes for maximum load operation the steps of compressing air in said compressor to a superatmospheric pressure at a predetermined rate, inter-stage cooling the air being compressed by condensate of vapor from said steam turbine, delivering the heated condensate to said steam generator, heating the compressed air to a predetermined high temperature, expanding the heated air through said aerodynamic turbine, and delivering substantially all of the expanded air to said furnace for use as combustion air; and for lower load operation the steps of compressing air at a variable rate lower than the maximum load rate while subjecting the air to inter-stage cooling by said vapor condensate, heating the compressed air, expanding the heated air through the aerodynamic turbine, delivering a portion of the expanded air in mixing relationship to the fuel and delivering the remaining expanded air into mixing relationship with the products of combustion from said furnace and so as to flow over only a portion of said air heater.

15. The method of wide range operation of a binary fluid power plant comprising a variable speed multiple stage air compressor, an expansion aerodynamic turbine, a condensing steam turbine, a steam generator, an air heater, and a fuel fired furnace serving the vapor generator and the air heater, which includes for maximum load operation the steps of compressing air in said compressor to a superatmospheric pressure at a predetermined rate, inter-stage cooling the air being compressed by condensate of vapor from said steam turbine, delivering the heated condensate to said steam generator, heating the compressed air to a predetermined high temperature, expanding the heated air through said aerodynamic turbine, and delivering substantially all of the expanded air to said furnace for use as combustion air; for higher fractional load operation the steps of compressing air at the maximum load rate while subjecting the air to inter-stage cooling by said vapor condensate, heating the compressed air to a predetermined high temperature, expanding the heated air through said aerodynamic turbine, delivering a major portion of the expanded air to said furnace for use as combustion air, and delivering the remaining expanded air into mixing relationship with the products of combustion from said furnace and so as to flow over only a portion of said air heater; and for intermediate load operation the steps of compressing air at a variable rate lower than the maximum load rate while subjecting the air to inter-stage cooling by said vapor condensate, heating the compressed air, expanding the heated air through the aerodynamic turbine, delivering a portion of the expanded air to said furnace for use as combustion air and delivering the remaining expanded air into mixing relationship with the products of combustion from said furnace and so as to flow over only a portion of said air heater.

16. The method of wide range operation of a binary fluid power plant comprising a variable speed multiple stage air compressor, an expansion aerodynamic turbine, a condensing steam turbine, a steam generator, an air heater, and a fuel fired furnace serving the vapor generator and the air heater, which includes for maximum load operation the steps of compressing air in said compressor to a superatmospheric pressure at a predetermined rate, inter-stage cooling the air being compressed by condensate of vapor from said steam turbine, delivering the heated condensate to said steam generator, heating the compressed air to a predetermined high temperature, expanding the air through said aerodynamic turbine, and delivering substantially all of the expanded air to said furnace for use as combustion air; for higher fractional load operation the steps of compressing air at the maximum load rate while subjecting the air to inter-stage cooling by said vapor condensate, heating the compressed air to a predetermined high temperature, expanding the heated air through said aerodynamic turbine, delivering a major portion of the expanded air to said furnace for use as combustion air, and delivering the remaining expanded air into mixing relationship with the products of combustion from said furnace and so as to flow over only a portion of said air heater; for intermediate load operation the steps of compressing air at a variable rate lower than the maximum load rate while subjecting the air to inter-stage cooling by said vapor condensate, heating the compressed air, expanding the heated air through the aerodynamic turbine, delivering a portion of the expanded air in mixing relationship to the fuel and delivering the remaining expanded air into mixing relationship with the products of combustion from said furnace and so as to flow over only a portion of said air heater; and for low load operation the steps of compressing air at a variable rate lower than the previously mentioned rates while subjecting the air to inter-stage cooling by said vapor condensate, heating the compressed air, expanding the heated air through the aerodynamic turbine, and delivering substantially all of the expanded air to said furnace for use as combustion air.

17. The method of wide range operation of a binary fluid power plant comprising a variable speed multiple stage air compressor, an expansion aerodynamic turbine, a condensing steam turbine, a steam generator, an air heater, and a fuel fired furnace serving the vapor generator and the air heater, which includes for maximum load operation the steps of compressing air in said compressor to a superatmospheric pressure at a predetermined rate, inter-stage cooling the air being compressed by condensate of vapor from said steam turbine, delivering the heated condensate to said steam generator, heating the compressed air to a predetermined high temperature, expanding the air through said aerodynamic turbine, and delivering substantially all of the expanded air to said furnace for use as combustion air; and for lower load operation the steps of compressing air at the maximum load rate while subjecting the air to inter-stage cooling in part by said vapor condensate and in part by a regulable flow of a separate cooling fluid, heating the compressed air to a predetermined high temperature, expanding the heated air through said aerodynamic turbine, delivering a major portion of the expanded air to said furnace for use as combustion air, and delivering the remaining expanded air into mixing relationship with the products of combustion from said furnace and so as to flow over only a portion of said air heater.

18. In a binary fluid power plant, a heat absorbing unit including a steam generator, a high temperature air heater, regulable fuel firing means arranged to supply heating gases to said generator and said air heater, a plurality of parallel gas passes, one of said passes containing at least a portion of said high temperature air heater, a second gas pass containing a steam superheater, damper means arranged to control the flow through at least one of said gas passes, a power driven air compressor arranged to supply air under pressure to said air heater, an aerodynamic prime mover, a conduit connecting the outlet of said air heater to said prime mover, an exhaust connection from said prime mover to said fuel firing means, means responsive to variations in the outlet temperature of the superheated steam, means responsive to variations in the outlet temperature of air heated by said air heater, and means jointly responsive to said steam temperature and air temperature responsive means for regulating said damper means.

19. In a binary fluid power plant, a heat absorbing unit comprising a steam generator, a high temperature air heater, and regulable fuel burning means arranged to supply heating gases to said generator and said air heater, compressor means arranged to supply air under pressure to said air heater, conduit means connecting the air outlet of said air heater to said fuel burning means, means responsive to the rate of steam delivery from said steam generator, means responsive to the temperature of the air discharge from said air heater, and means jointly responsive to both of said responsive means for regulating said fuel burning means.

20. In a binary fluid power plant, a heat absorbing unit comprising a steam generator, a high temperature air heater, and regulable fuel burning means arranged to supply heating gases to said generator and said air heater, a heating gas pass containing said air heater and said steam superheater in spaced positions relative to heating gas flow, a power driven air compressor arranged to supply air under pressure to said air heater, an aerodynamic prime mover, a conduit connection from the outlet of said air heater to said prime mover, an exhaust air connection from said prime mover to said fuel burning means, an exhaust air connection from said prime mover to said heating gas pass at a position rearward of said superheater, means responsive to the rate of steam delivery from said steam generator, means responsive to the temperature of the air discharged from the air heater, means jointly responsive to said steam delivery and said air temperature responsive means for regulating said fuel burning means, and means jointly responsive to said steam delivery and said air temperature responsive means for regulating the exhaust air flow in said exhaust air connection.

21. In a binary fluid power plant, a heat absorbing unit comprising a steam generator, a high temperature air heater, and regulable fuel burning means arranged to supply heating gases to said generator and said air heater, a variable speed power driven air compressor arranged to supply air under pressure to said air heater, a conduit connection from the air outlet of said air heater to said fuel burning means, means responsive to the rate of steam delivery from said steam generator, means responsive to the temperature of the air discharge from the air heater, means jointly responsive to said steam delivery and air temperature responsive means for regulating said fuel burning means, and means jointly responsive to said steam delivery and air temperature responsive means for regulating the speed of said air compressor.

22. In a binary fluid power plant, a heat absorbing unit comprising a steam generator, a high temperature pressure air heater, and fuel fired means supplying heating gases to said generator and said air heater, a power driven air compressor, a conduit connection from the air discharge of said air compressor to the air inlet of said air heater, a heating gas pass containing said air heater and a steam superheater in spaced positions relative to heating gas flow, an aerodynamic prime mover, a conduit connection from the air outlet of said air heater to said prime mover, an exhaust air connection from said prime mover to said fuel fired means, an exhaust air connection from said prime mover to said heating gas pass at a position rearward of said superheater, a flow control valve in at least one of said exhause air connections, and means responsive to the temperature of air in said conduit connection from the air heater outlet for positioning said flow control valve.

23. In a binary fluid power plant, a heat absorbing unit comprising a steam generator, a high temperature air heater, regulable fuel firing means arranged to supply heating gases to said generator and said air heater, a plurality of parallel gas passes, one of said passes containing at least a portion of said high temperature air heater, a second gas pass containing a steam superheater, damper means arranged to control at least one of said gas passes, a power driven air compressor arranged to supply air under pressure to said air heater, an aerodynamic prime mover, a conduit connection from the outlet of said air heater to said prime mover, an exhaust connection from said prime mover to said fuel firing means, and means responsive to variations in the temperature of the air in said conduit connection from the outlet of said heater arranged to control the positioning of said damper means.

24. In a binary fluid power plant, a heat absorbing unit comprising a steam generator, a high temperature air heater, regulable fuel firing means arranged to supply heating gases to said generator and said air heater, a steam condenser, a steam prime mover connected to receive steam from said generator and to exhaust to said condenser, a variable speed power driven multiple stage air compressor constructed and arranged to supply air under pressure to said air heater, an inter-stage air cooler for said compressor, means for passing condensate through said air cooler and the heated condensate to said generator, an aerodynamic prime mover, a conduit connection from the outlet of said air heater to said aerodynamic prime mover, an exhaust air connection from said aerodynamic prime mover to said fuel firing means, and means responsive to the temperature of air leaving said air cooler for varying the speed of said compressor.

25. In a binary fluid power plant, a heat absorbing unit comprising a steam generator, a high temperature air heater, regulable fuel firing means arranged ot supply heating gases to said generator and said air heater, a steam condenser, a steam prime mover connected to receive steam from said generator and to exhaust to said condenser, a power driven multiple stage air compressor constructed and arranged to supply air under pressure to said air heater, an inter-stage air cooler for said compressor, means for passing condensate through said air cooler and the heated condensate to said generator, an aerodynamic prime mover, a conduit connection from the outlet of said air heater to said aerodynamic prime mover, an exhaust air connection from said areodynamic prime mover to said fuel firing means, and means responsive to the temperature of the air leaving said air cooler for varying the rate of heat liberation by said fuel firing means.

26. In a binary fluid power plant, a fuel fired high pressure steam generator including a furnace having fuel burning means, steam generating tubes arranged to receive heat from the furnace, and a plurality of gas passes for high temperature products of combustion leading from said furnace, a convection steam superheater receiving steam from said generating tubes and located in one of said gas passes, fluid heating surface in a second of said gas passes, adjustable damper means in at least one of said gas passes, a gas outlet pass connected to the gas outlet end of said two gas passes, a low temperature pressure air heater in said gas outlet pass at a position rearward of said superheater with respect to gas flow and forming substantially the entire low temperature level heat absorbing surface of said steam generator, a high temperature gaseous fluid heater connected to the outlet of said low temperature air heater, a power driven superatmospheric pressure multi-stage air compressor connected to discharge into said low temperature air heater, an interstage air cooler associated with said compressor, a high pressure steam prime mover arranged to receive superheated steam from said steam superheater, a steam condenser receiving exhaust vapor from said prime mover, pumping and conduit means constructed and arranged to pass condensate through said air cooler to said steam generator as feed water, a gas turbine receiving a high temperature superatmospheric pressure gaseous fluid medium from said high temperature gaseous fluid heater for expansion in the generation of power, and a conduit connection arranged to deliver expanded gases from said gas turbine to said fuel burning means.

LEWIS W. HELLER.

References Cited in the file of this patent

UNITED STATES PATENTS

| Number | Name | Date |
|---|---|---|
| 1,938,366 | Armacost | Dec. 5, 1933 |
| 1,978,837 | Forsling | Oct. 30, 1934 |
| 1,983,624 | Lundgren | Dec. 11, 1934 |
| 2,110,422 | Norguet | Mar. 8, 1938 |
| 2,170,350 | Hardgrove | Aug. 22, 1939 |
| 2,184,224 | Lucke | Dec. 19, 1939 |
| 2,294,700 | Stroehlen | Sept. 1, 1942 |
| 2,298,700 | Junkins et al. | Oct. 13, 1942 |
| 2,340,086 | Southcott | Jan. 25, 1944 |
| 2,404,938 | Armacost et al. | July 30, 1946 |
| 2,428,136 | Barr | Sept. 30, 1947 |
| 2,466,723 | Mercier et al. | Apr. 12, 1949 |
| 2,471,755 | Karrer | May 31, 1949 |
| 2,486,291 | Karrer | Oct. 25, 1949 |
| 2,502,941 | Giger et al. | Apr. 4, 1950 |
| 2,539,255 | Karrer et al. | Jan. 23, 1951 |
| 2,540,598 | Ruiz | Feb. 6, 1951 |

FOREIGN PATENTS

| Number | Country | Date |
|---|---|---|
| 469,311 | Great Britain | July 22, 1937 |
| 526,173 | Germany | June 3, 1931 |
| 86,349 | Switzerland | Oct. 16, 1920 |
| 173,497 | Switzerland | Feb. 16, 1935 |
| 211,358 | Switzerland | Dec. 2, 1940 |
| 226,746 | Switzerland | Jan. 17, 1944 |
| 226,747 | Switzerland | Jan. 17, 1944 |
| 254,066 | Switzerland | Dec. 1, 1948 |